United States Patent
Eden

(10) Patent No.: US 9,413,469 B2
(45) Date of Patent: *Aug. 9, 2016

(54) APPARATUS AND METHOD SUPPORTING COVERT COMMUNICATIONS USING TERAHERTZ IMAGING CAMERA

(71) Applicant: Dayton D. Eden, Dallas, TX (US)

(72) Inventor: Dayton D. Eden, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/567,890

(22) Filed: Dec. 11, 2014

(65) Prior Publication Data

US 2015/0092063 A1    Apr. 2, 2015

Related U.S. Application Data

(63) Continuation-in-part of application No. 13/926,767, filed on Jun. 25, 2013, now Pat. No. 8,934,021.

(60) Provisional application No. 61/690,600, filed on Jul. 2, 2012.

(51) Int. Cl.
*H04B 10/67* (2013.01)
*H04N 5/33* (2006.01)
*H04N 5/225* (2006.01)

(Continued)

(52) U.S. Cl.
CPC .............. *H04B 10/67* (2013.01); *G01J 5/0803* (2013.01); *G01J 5/0837* (2013.01); *G01J 5/0846* (2013.01); *G01J 5/20* (2013.01); *G01J 5/22* (2013.01); *G01V 3/10* (2013.01); *G01V 8/005* (2013.01); *H04N 5/2258* (2013.01); *H04N 5/33* (2013.01);

(Continued)

(58) Field of Classification Search
CPC ............ G01J 2005/0077; G01J 5/0803; G01J 5/0837; G01J 5/0846; G01J 5/20; G01J 5/22; H04B 10/67; H04N 5/2258; H04N 5/33; H04N 5/332

See application file for complete search history.

(56) References Cited

U.S. PATENT DOCUMENTS

| | | | | |
|---|---|---|---|---|
| 5,935,183 A | * | 8/1999 | Sahm | ............... E01C 19/006 172/4.5 |
| 7,692,147 B2 | * | 4/2010 | Hu | ............... G01N 21/3151 250/336.1 |

(Continued)

OTHER PUBLICATIONS

Eden, D.; "Antenna-coupled microbolometer millimeter wave focal plane array technology"; Proceedings of SPIE vol. 4719; 2002; 12 pages.

(Continued)

*Primary Examiner* — Dave Czekaj
*Assistant Examiner* — Md Haque

(57) ABSTRACT

An apparatus includes a link receiver having a detector array configured to receive radiation from a remote communication device, where the detector array includes multiple detectors. Each detector includes a horn receiver configured to capture the radiation using an antenna positioned in or proximate to a throat of the horn receiver, where the antenna is coupled to an antenna load. Each detector also includes a bolometer electrically isolated from the antenna load and in thermal contact with the antenna load. The link receiver could include a terahertz camera. The detector array can be located at a focal plane of an optical system configured to receive the radiation through a specified far-field solid angle. The apparatus could also include a link transmitter configured to generate and transmit second radiation to the remote communication device and/or a communication transmitter/receiver configured to communicate with the remote communication device.

25 Claims, 31 Drawing Sheets

(51) Int. Cl.
*G01J 5/08* (2006.01)
*G01J 5/20* (2006.01)
*G01J 5/22* (2006.01)
*G01V 8/00* (2006.01)
*G01V 3/10* (2006.01)
*G01J 5/00* (2006.01)

(52) U.S. Cl.
CPC ......... *H04N 5/332* (2013.01); *G01J 2005/0077* (2013.01)

(56) References Cited

U.S. PATENT DOCUMENTS

| | | | | |
|---|---|---|---|---|
| 7,795,859 B1* | 9/2010 | Lynch | .................... | G01S 13/89 324/120 |
| 8,513,606 B2 | 8/2013 | Oda | | |
| 8,934,021 B2 | 1/2015 | Eden | | |
| 2001/0045978 A1* | 11/2001 | McConnell | ............. | A63F 13/00 348/42 |
| 2004/0207914 A1* | 10/2004 | Beach | ................. | G02B 17/084 359/365 |
| 2004/0263400 A1* | 12/2004 | Yuanzhu | ............. | H01Q 9/0442 343/702 |
| 2006/0208193 A1* | 9/2006 | Bodkin | .................... | G01J 3/02 250/353 |
| 2006/0288796 A1* | 12/2006 | Giazotto | ............... | B64C 25/001 73/800 |
| 2011/0108729 A1 | 5/2011 | Oda | | |
| 2014/0002666 A1 | 1/2014 | Eden | | |

OTHER PUBLICATIONS

Xie, et al.; "A Z-Axis Quartz Cross-Fork Micromachined Gyroscope Based on Shear Stress Detection"; Sensors 2010; 16 pages.
Rangsten, et al.; "Etch rates of crystallographic planes in Z-cut quartz-experiments and simulation"; Journal of Micromechanics & Microengineering vol. 8, No. 1; 1998; 6 pages.
Singh, A.; "Optic Flow Computation, A Unified Perspective"; IEEE Computer Society Press; 1991; 12 pages.
"Pseudo Flight Test Program, Final Report"; U.S. Air Force; Sep. 1995; 14 pages.
Eden, D.; "Monthly Status Report for the Affordable Millimeter Wave Electronic Technology Program Phase II"; Nov. 1-Nov. 30, 2001; 47 pages.
Anderson, et al.; "A 24X28 Bolometer-Based Passive Millimeter Wave Imager"; Apr. 2002; 12 pages.
Grossman, et al.; "Terahertz Active Direct Detection Imagers"; Published Sep. 8, 2004; SPIE Proceedings vol. 5411; 11 pages.
Eisele, et al.; "Recent Advances in the Performance of InP Gunn Devices and GaAs TUNNETT Diodes for the 100-300-GHz Frequency Range and Above;" IEEE 48.4; Apr. 1, 2000; 6 pgs.
"Microbolometer"; Retrieved from http://en.wikipedia.org/w/index.php?title=Microbolometer&oldid=542543132; Mar. 7, 2013; 5 pages.
"Metal-mesh optical filter"; Retrieved from http://en.wikipedia.org/w/index.php?title=Metal-mesh_optical_filter&oldid=644658184; Jan. 29, 2015; 9 pages.

* cited by examiner

400
APPARATUS AND METHOD SUPPORTING COVERT COMMUNICATIONS USING TERAHERTZ IMAGING CAMERA

CROSS-REFERENCE TO RELATED APPLICATIONS AND PRIORITY CLAIM

This application claims priority under 35 U.S.C. §120 as a continuation-in-part of U.S. patent application Ser. No. 13/926,767 filed on Jun. 25, 2013, which claims priority under 35 U.S.C. §119(e) to U.S. Provisional Patent Application No. 61/690,600 filed on Jul. 2, 2012. Both of these applications are hereby incorporated by reference in their entirety.

TECHNICAL FIELD

This disclosure relates generally to communication systems. More specifically, this disclosure relates to an apparatus and method supporting covert communications using (in part) a terahertz imaging camera.

BACKGROUND

Since the last decade of the twentieth century, there has been increasing interest in building cameras that utilize the shortest wavelengths of the radio frequency (RF) portion of the electromagnetic spectrum that still penetrate materials. The range of interest typically starts at the "W band" (about 75 GHz to about 110 GHz) and extends into higher terahertz frequencies. The general concept is to perform imaging to detect and recognize objects of interest concealed behind cover materials such as clothing. This is passive imaging in that natural radiation from a scene is used to perceive differences in the apparent temperatures of objects.

SUMMARY

This disclosure provides an apparatus and method supporting communications using terahertz imaging.

In a first embodiment, an apparatus includes a link receiver having a detector array configured to receive radiation from a remote communication device, where the detector array includes multiple detectors. Each detector includes a horn receiver configured to capture the radiation using an antenna positioned in or proximate to a throat of the horn receiver, where the antenna is coupled to an antenna load. Each detector also includes a bolometer electrically isolated from the antenna load and in thermal contact with the antenna load.

In a second embodiment, a system includes a first communication device having a link receiver, a link transmitter, and a communication transmitter/receiver. The link receiver includes a detector array configured to receive first radiation from a second communication device, where the detector array includes multiple detectors. Each detector includes a horn receiver configured to capture the first radiation using an antenna positioned in or proximate to a throat of the horn receiver, where the antenna is coupled to an antenna load. Each detector also includes a bolometer electrically isolated from the antenna load and in thermal contact with the antenna load. The link transmitter is configured to transmit second radiation to the second communication device. The communication transmitter/receiver is configured to communicate with the second communication device.

In a third embodiment, a method includes identifying, at a first communication device, angular coordinates to a second communication device using a link receiver at the first communication device. The method also includes communicating with the second communication device using a communication transmitter/receiver of the first communication device. The link receiver includes a detector array configured to receive radiation from the second communication device, where the detector array includes multiple detectors. Each detector includes a horn receiver configured to capture the radiation using an antenna positioned in or proximate to a throat of the horn receiver, where the antenna is coupled to an antenna load. Each detector also includes a bolometer electrically isolated from the antenna load and in thermal contact with the antenna load.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
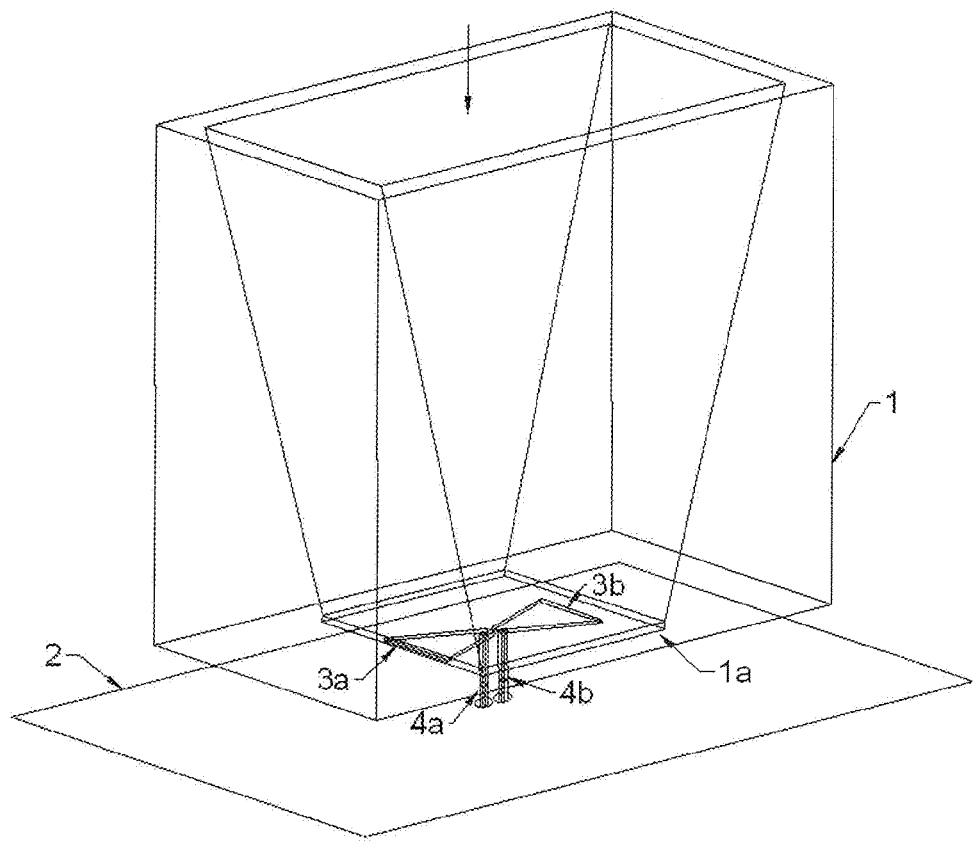
FIG. 1 shows a perspective view of a single horn receiver with incident radiation entering from above and with a bow tie antenna positioned at its throat.
Figure 63:
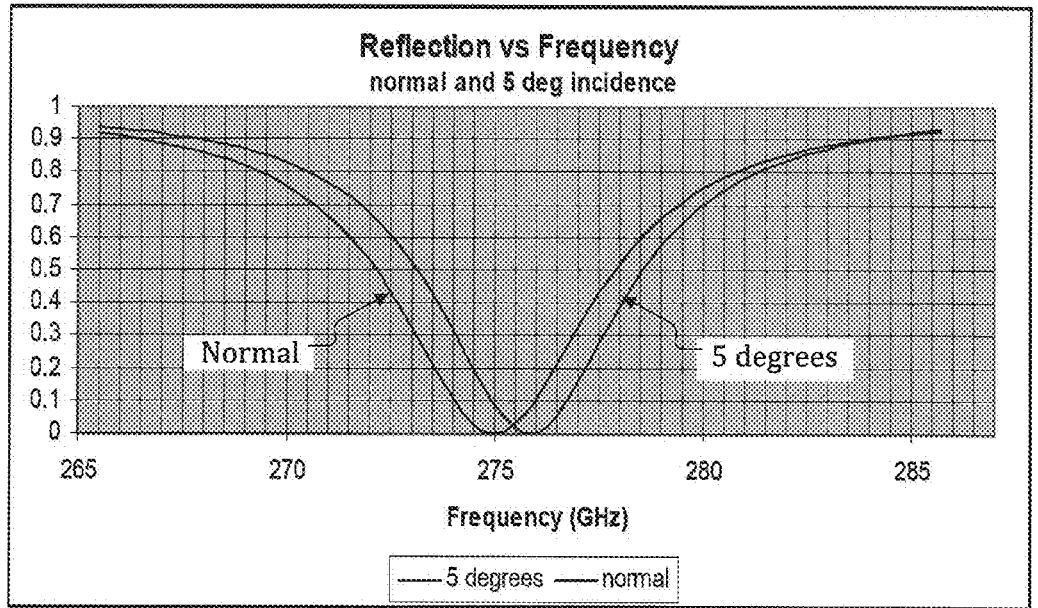

FIGS. 1 through 63, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In this document, terahertz radiation is defined for the frequency range from about 0.1 THz to about 0.5 THz. This radiation sees through many materials, such as clothing, tarps, camouflage, foliage, and some walls. It also enables the detection of concealed weapons, explosives, and other objects. Some conventional imaging systems operate at these frequencies, but these types of conventional systems suffer from high cost, limited utility, and high power consumption.

This disclosure provides a passive terahertz imaging system that can be lightweight, low cost, and portable while using very little power. The imaging system here includes a high-density staring terahertz focal plane detector array. The imaging system can be deployed in a wide variety of locations. Angular resolution can be high, and a detectable change in scene temperature can be very small, such as a few degrees Kelvin at 7.5 and 30 Hz. An embedded infrared camera, such as a long-wave infrared (LWIR) camera, or visible camera with special image processing can help to facilitate an additional reduction in terahertz detectable scene temperature changes, such as to below 0.5 Kelvin at 7.5 and 30 Hz. LWIR or other infrared imagery or visible imagery also provides additional high-resolution situation awareness. Operation can occur at normal ambient temperatures, and the same design can be used for a variety of receiving apertures and frequency bands.

As described in more detail below, in some embodiments, an integrated imaging system includes a terahertz camera and an infrared or visible camera, such as a commercially-available or other uncooled LWIR camera. The nominal center of the imaging system in the terahertz band could be about 0.3 THz. The terahertz camera can include a two-dimensional (2D) antenna-coupled micro-bolometer detector array, with a ground plane separating an antenna array and a bolometer array. This allows substantial independence between the two arrays, meaning the arrays can be designed and fabricated separately and joined later. Improved detector sensitivity can be achieved using low noise-equivalent power (NEP) for the bolometers and wide-reception bandwidth for the antennas. Low NEP can be achieved by taking advantage of micro-bolometer array technology and manufacturing developed for infrared devices. The bolometer configuration and bias can be uniquely applicable to an antenna input. The antenna design and layout can be aided by three-dimensional (3D) finite-element computer aided design (CAD) simulation or other types of simulations.

With various design features described below, high antenna gain and wide bandwidth can be achieved. Also described below are techniques for fabrication and packaging of the antenna array. High angular resolution of the system comes in part from being able to conveniently over-sample the array. This can be accomplished through the arrangement of the elements in the array and an option afforded by modified Cassegrain optics. The system also contains one or more processing devices that use the output of an infrared/visible camera to control a terahertz camera and drive a terahertz display. This capability is used to create a high frame rate stream of terahertz images where each frame benefits from an extended dwell time, but the extended dwell may appear only at the beginning of the stream. This creates an enhanced terahertz video delayed in time, and the delay can be dependent on the operator's choice based on the situation. The infrared/visible camera can also produce its own high-resolution video for additional situation awareness.

This system is capable of producing imagery that reveals objects hidden behind or under clothing, tarps, camouflage, some building materials, or other materials. This is accomplished using a system that can be affordable, lightweight, low power, portable, and battery operated. A variety of different receiving apertures and frequency bands may be derived from the staring array design. The overall system and its operational modes constitute a very versatile tool for a wide variety of applications.

A terahertz focal plane detector array includes an antenna array and a bolometer array. Processing of the bolometer array is not specifically described here because, apart from spacing and pretreatment of a substrate upon which the bolometers are fabricated, the process can be essentially the same as for uncooled infrared (IR) arrays. In general, each detector in the terahertz array has incoming radiation collected by a receiving horn and captured by an antenna (such as a bow tie antenna) positioned at the throat of the receiving horn. Output posts of the antenna are fed to a bolometer below a ground plane through irises in the ground plane.

This disclosure further provides communication devices that operate using terahertz radiation. The communication devices employ passive terahertz cameras (with or without embedded infrared cameras) as imagers to establish and maintain highly-covert communication links. This functionality could find use in a variety of instances, such as covert support of forward military units for force protection, airborne surveillance with communications to ground, ship-to-ship or ship-to-shore communications, and relaying information using multiple covert links. A link can maintain lock for continuous communications between moving platforms. Link operation is extremely simple, and the overall system is highly flexible with low weight, volume, power and cost.

FIG. 1 shows a perspective view of a single horn receiver 1 with incident radiation entering from above and with a bow tie antenna positioned at its throat 1a. The incident radiation is indicated by the arrow at the top of FIG. 1. The horn receiver 1 is shown as a block, rendered in wireframe to allow the interior details to be seen. A horn receiver generally denotes a structure having an opening that receives radiation and directs the radiation to at least one antenna, and the opening narrows from a larger area (where the radiation is received) to a smaller area (where the antenna is located). The antenna at the throat 1a of the horn receiver 1 in FIG. 1 is a bow tie antenna with arms 3a-3b, and output posts 4a and 4b from the antenna are shown entering a ground plane 2 directly below. One advantage here is that the ground plane can function as a shield, giving design independence between the horn receiver/antenna array on top and the bolometer array below. The arrays can therefore be fabricated separately and joined later if desired.

Figure 2:
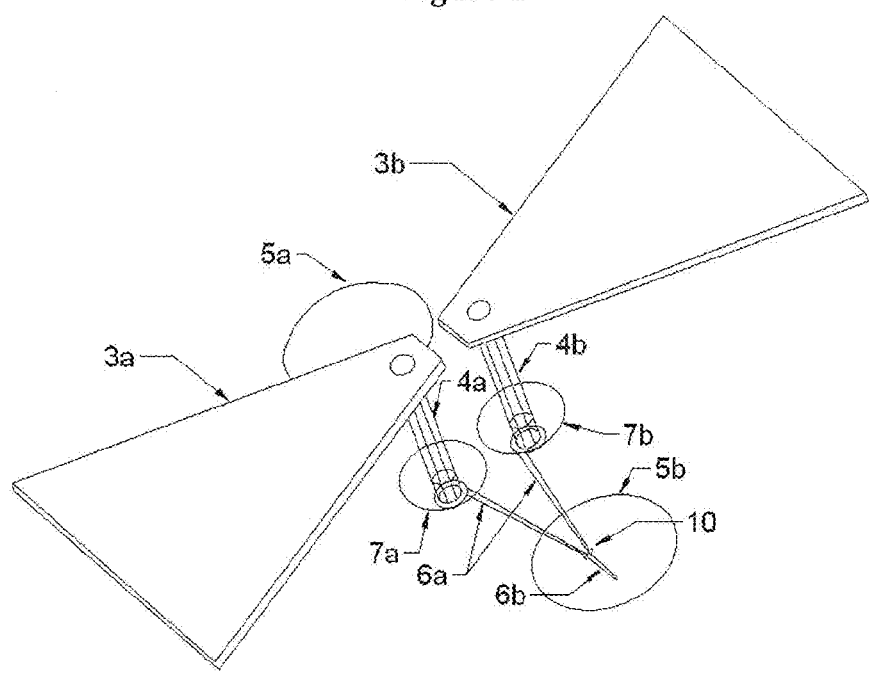
FIG. 2 shows a magnified view of the throat area of the horn receiver including bow tie antenna posts, irises in a ground plane, and lateral signal traces.

In the following discussion, any dimensions and materials cited are for illustration only, and other selections may lead to different behaviors of the system. These different choices can be made using more precise modeling and incremental improvements in design. The horn receiver 1 and the bow tie antenna could have any suitable dimensions. For example, the horn receiver 1 could have a height of about 2 millimeters, and the throat 1a of the horn receiver 1 could be about 0.9 millimeters by about 0.9 millimeters. Also, the total span of the bow tie antenna could be about 0.8 millimeters FIG. 2 shows a magnified view of the throat area 1a of the horn receiver 1 including bow tie antenna posts, irises in a ground plane, and lateral signal traces. Here, irises 7a and 7b in the ground plane 2 are shown more clearly. Each iris 7a and 7b could have any suitable shape and size, such as circles having a diameter of about 90 microns. Below the ground plane 2, the antenna posts 4a and 4b are connected to conducting traces 6a, which converge into an extension 6b representing a twin lead. Circles 5a-5b represent additional holes in the ground plane 2 and are described below. The circles 5a-5b could have any suitable diameter, such as about 150 microns. A middle support 10 is used to support the conducting traces 6a.

Figure 3:
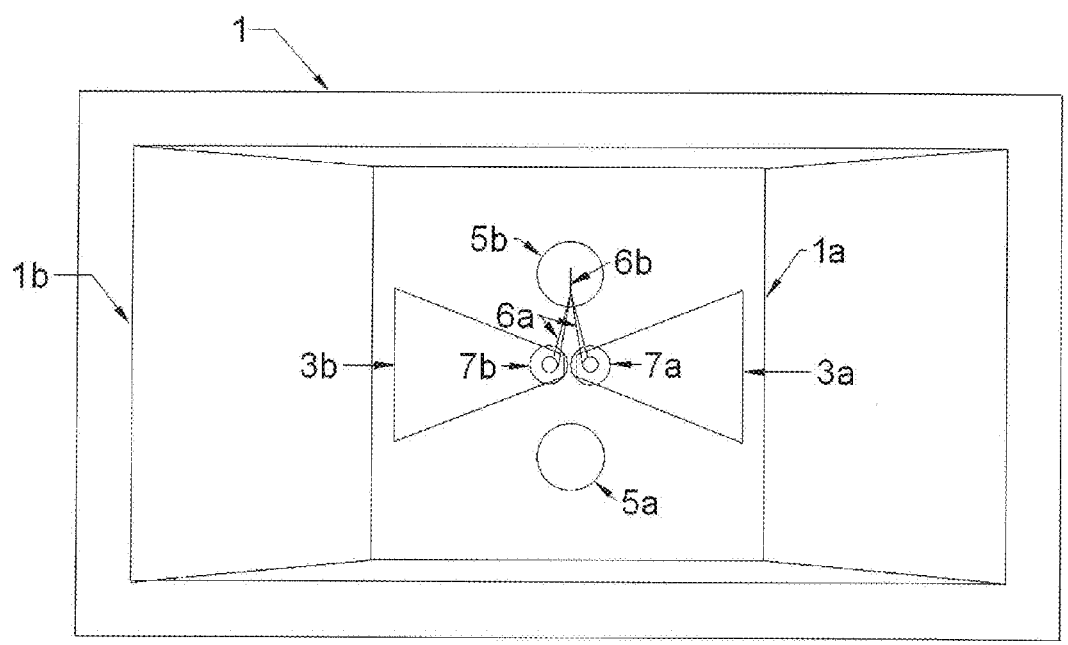
FIG. 3 shows a top view of the horn receiver and the bow tie antenna.

FIG. 3 shows a top view of the horn receiver 1 and the bow tie antenna. The ground plane 2 is omitted here for clarity. As can be seen in FIG. 3, the horn receiver 1 may be asymmetric. For example, a mouth 1b of the horn receiver 1 could have dimensions of about 2 millimeters by about 1 millimeter, while the throat 1a of the horn receiver 1 could have dimensions of about 0.9 millimeters by about 0.9 millimeters.

Figure 4:
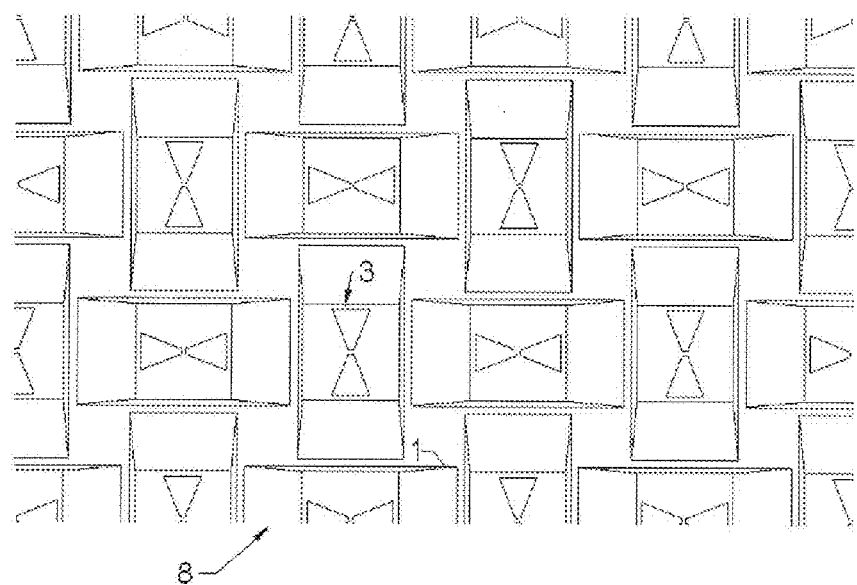
FIG. 4 shows a two-dimensional array of the horn receiver/bow tie antenna combinations of FIG. 3 with some details removed for simplicity.

FIG. 4 shows a two-dimensional array 8 of the horn receiver/bow tie antenna combinations of FIG. 3 with some details removed for simplicity. This is a "crisscross" array in which adjacent horn receivers/bow tie antennas are oriented orthogonally, which allows tight packing of elements and reduces or minimizes cross coupling and interference. As a result, each individual array element and its nearest neighbors are cross-polarized. The horn receivers 1 could have any suitable spacing(s) in the array 8, such as vertical and horizontal spacings of about 1.5 millimeters. Details of each bow tie antenna 3 have been emitted, and FIG. 4 shows only a portion of a large number of detectors (such as up to 8,000 detectors or more) that can be placed on a tile.

Figure 5:
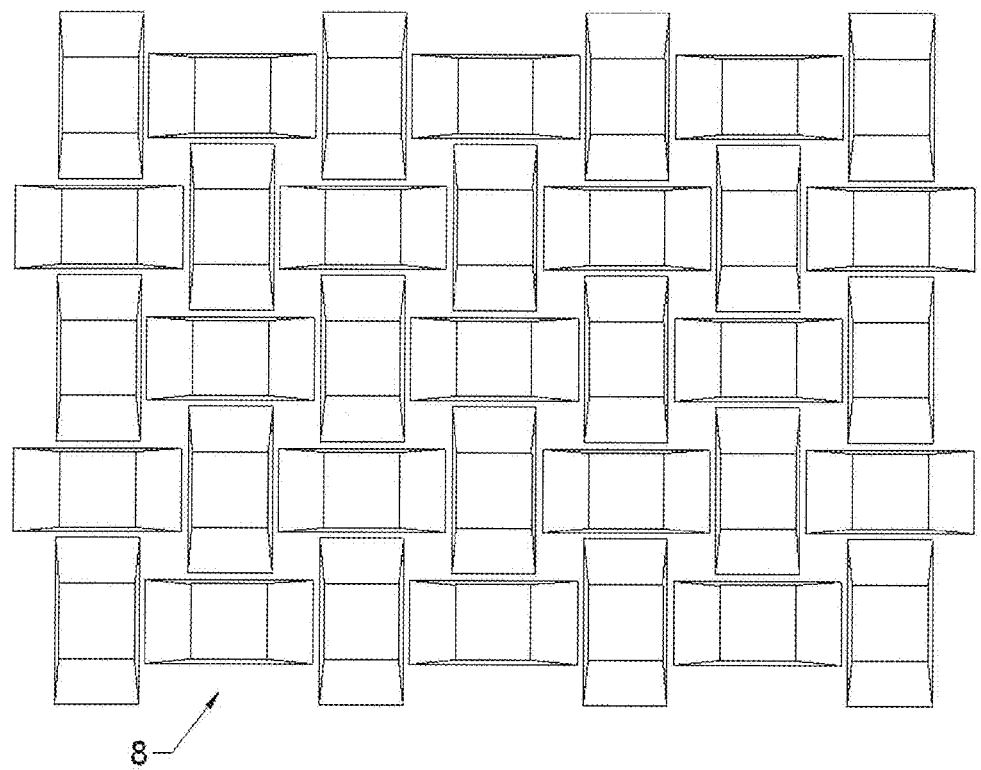
FIG. 5 shows the two-dimensional array with only the horn receivers fabricated in one piece and referred to as a director.

One advantage of using a horn receiver 1 to collect radiation is that a substantially consistent high gain can be obtained over a wide bandwidth for a horn receiver/antenna combination, together with a greater decoupling between elements in an array. Additional flexibility can come from the fact that the array's performance is approximately the same whether the antennas 3 are oriented parallel with or perpendicular to the long mouth dimension of the horn receiver 1. FIG. 5 shows the two-dimensional array with only the horn receivers 1 fabricated in one piece and referred to as a "director."

Figure 6:
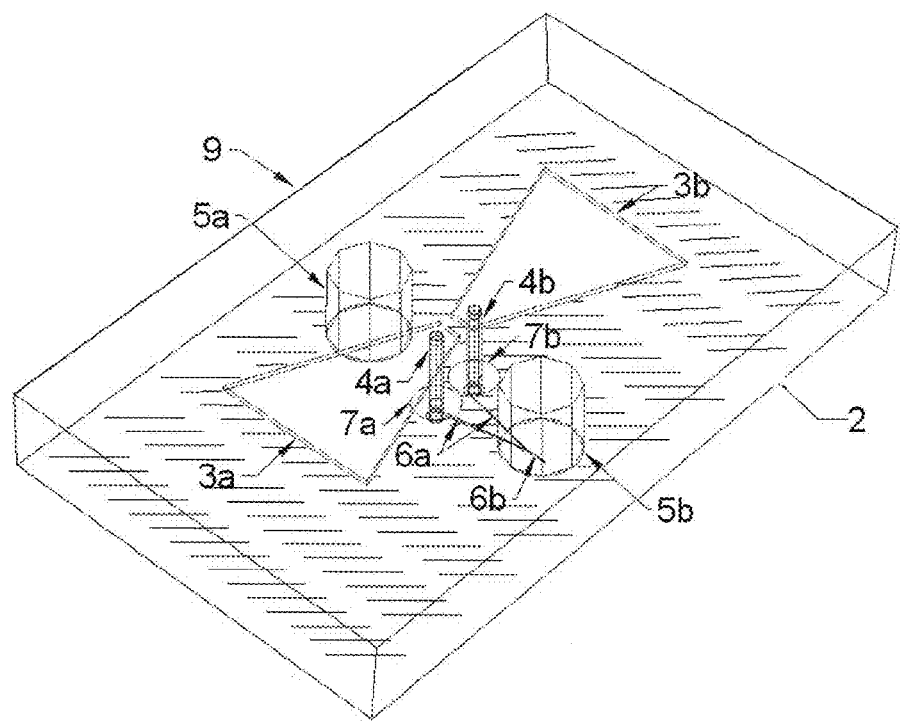
FIG. 6 shows a layer of crystalline quartz separating the bow tie antenna from the ground plane.

FIG. 6 shows a layer of crystalline quartz 9 separating the bow tie antenna from the ground plane 2. The crystalline quartz 9 here provides a mechanism by which the antenna arms 3a-3b and the ground plane 2 can be maintained at a precise separation. The crystalline quartz 9 could have any suitable dimensions, such as a thickness of about 147.5 microns. The ground plane 2 is the sketched area at the bottom surface of the quartz 9. It can be seen here that the holes 5a-5b penetrate both the ground plane 2 and the crystalline quartz 9. These holes 5a-5b allow space around bolometers below the ground plane 2 to be evacuated so that the bolometers can operate in a vacuum. Note that the use of crystalline quartz is an example only and that other material(s) could be used to separate a bow tie antenna from a ground plane.

Figure 7:
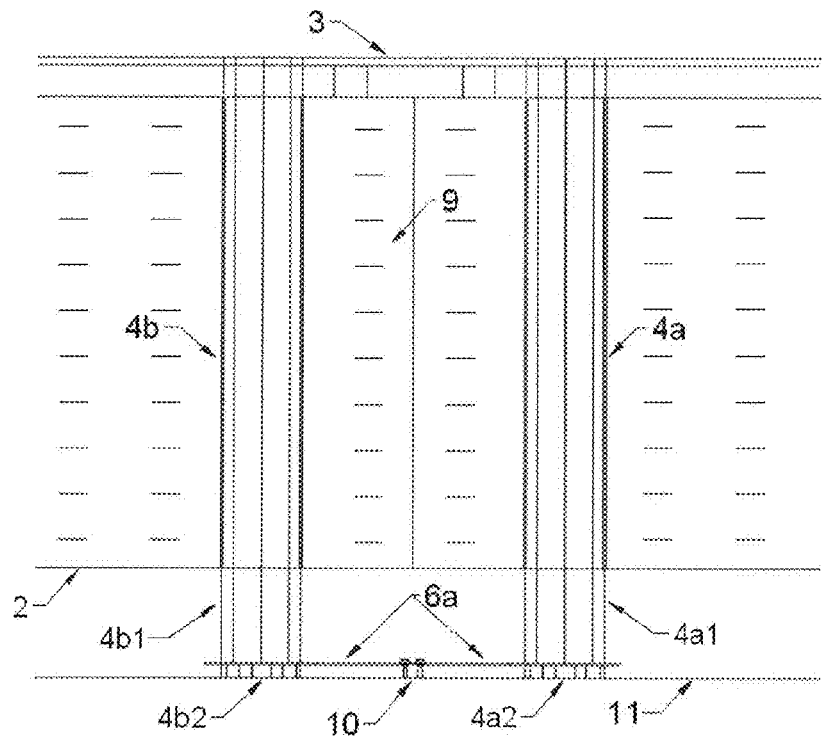
FIG. 7 shows a highly magnified front view of the antenna posts and the signal traces.
Figure 8:
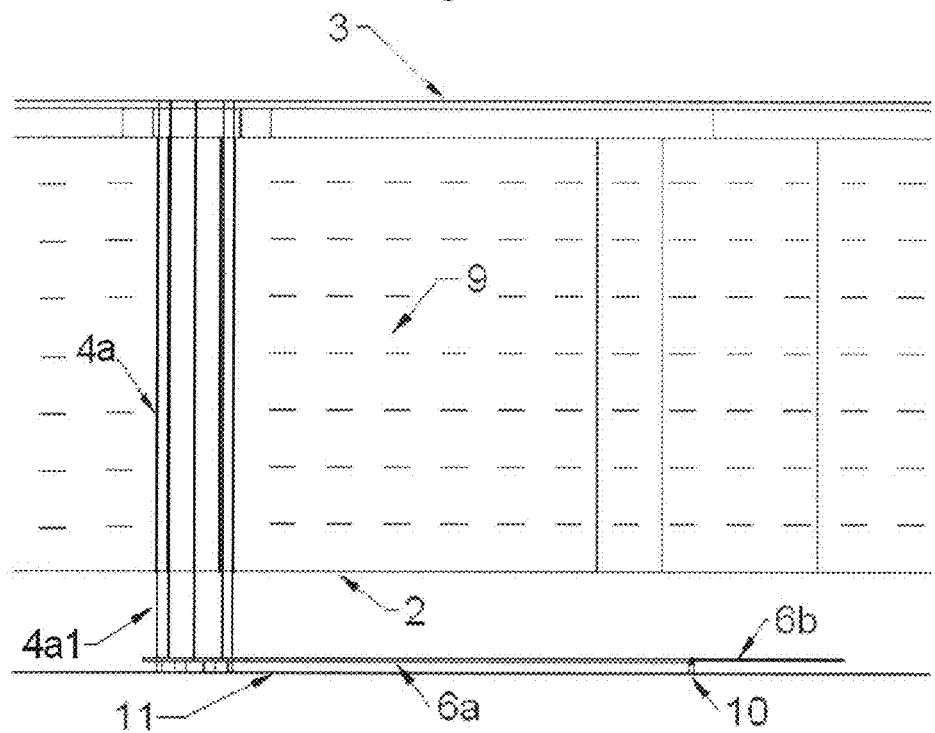
FIG. 8 shows a highly magnified side view of the antenna posts and the signal traces.

FIG. 7 shows a highly magnified front view of the antenna posts 4a-4b and the signal traces 6a. FIG. 8 shows a highly magnified side view of the antenna posts 4a-4b and the signal traces 6a. Both views are cropped to show only the immediate area around the antenna posts and the signal traces. FIG. 7 shows a front view with the two antenna posts 4a-4b visible, and extensions 4a1-4b1 of the posts 4a-4b are also shown. These extensions 4a1-4b1 could be laid down as solder bumps as described below. The antenna posts 4a-4b can have any suitable size and shape, such as generally cylindrical structures having a diameter of about 25 microns.

The crystalline quartz 9 is shown here as separating the antennas 3 and the ground plane 2. At the bottom is an upper surface of a substrate 11 upon which bolometers can be fabricated. The traces 6a from the antenna posts 4a-4b are positioned on or above the substrate 11, such as about 4 microns above the substrate 11. The traces 6a are supported by conducting pedestals 4a2-4b2 under the antenna post extensions 4a1-4b1 and by the middle support 10. In some embodiments, the support 10 may include two metal posts about 3.5 microns high topped by about 0.5 microns of insulating material. In particular embodiments, the traces 6a may be supported only at the position of the support 10 and at the antenna post locations. The gap between the substrate 11 and the ground plane 2 can have any suitable size, such as about 30 microns. There may be no intervening material placed in the gap, other than more widely spaced solder bumps described below. The substrate 11 could be formed from any suitable material(s), such as high-resistivity silicon or quartz glass.

FIG. 8 shows a side view with only the antenna post 4a visible. Here, the length of the traces 6a from the antenna posts 4a-4b are shown with the support 10 at the junction between the traces 6a and the extension 6b. The extension 6b is a twin lead terminated by an antenna load.

Figure 9:
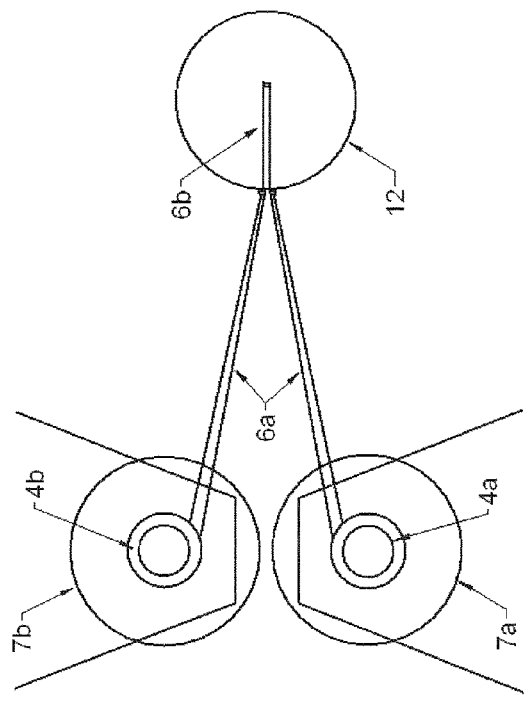
FIG. 9 shows a top view of the signal traces and a twin lead.
Figure 11:
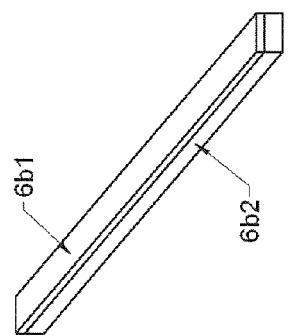
FIG. 11 shows a structure of the twin lead.
Figure 10:
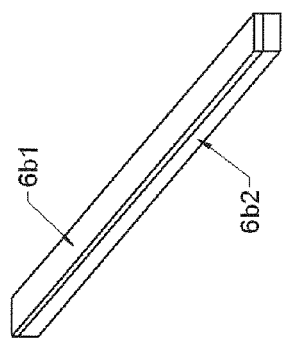
FIG. 10 shows the twin lead in more detail with a terminating load.
Figure 10:
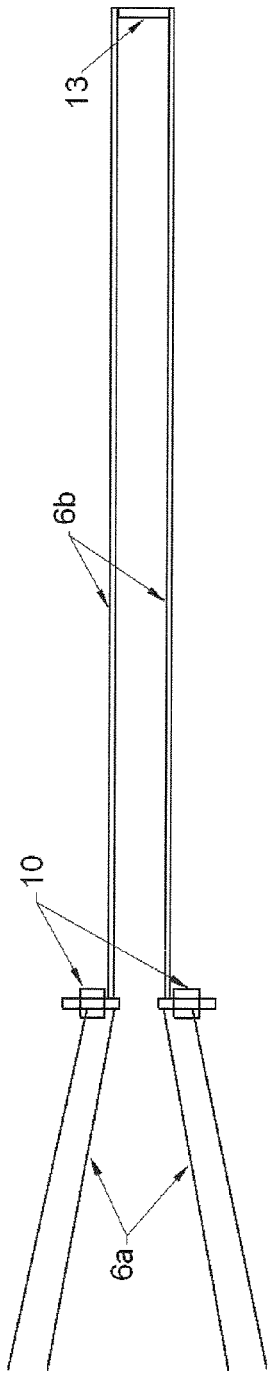

FIG. 9 shows a top view of the signal traces 6a and a twin lead (the extension 6b). A circle around the extension 6b represents the boundary of a thermal bridge 12. FIG. 10 shows the twin lead in more detail with a terminating load. In this example, the load represents an antenna load 13 terminating the twin lead, but note that the antenna load 13 may be configured differently than shown. The twin lead forming the extension 6b could have any suitable size, shape, and design, such as a layered design that is about 50 microns long. FIG. 11 shows a structure of the twin lead. Each lead includes an upper layer 6b1, such as a layer of titanium about 0.075 microns thick. Each lead also includes a bottom layer 6b2, such as a layer of silicon oxide or silicon nitride that is about 0.1 microns thick. Both leads can be about 0.3 microns wide. The resistivity of titanium is about $4 \times 10^{-5}$ ohm-centimeters and the resistivity of silicon oxide is about $1 \times 10^{15}$ ohm-centimeters, so the resistance of each lead may be about 889 ohms. The center-to-center separation of the twin leads can be about 2.8 microns.

Figure 12:
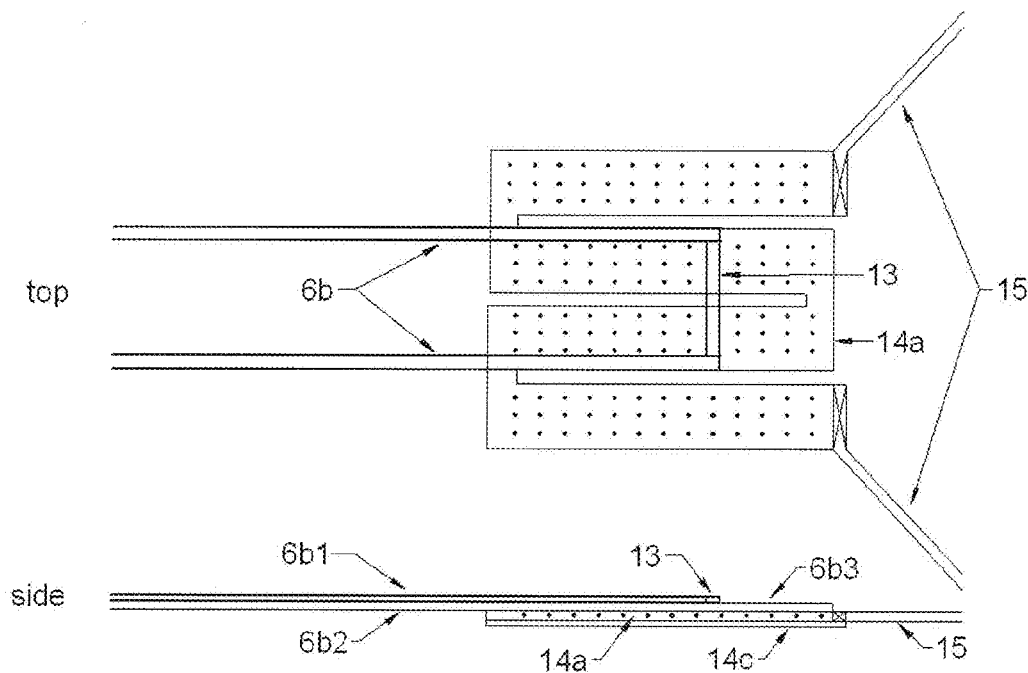
FIG. 12 shows the inclusion of vanadium oxide as a bolometer material.
Figure 13:
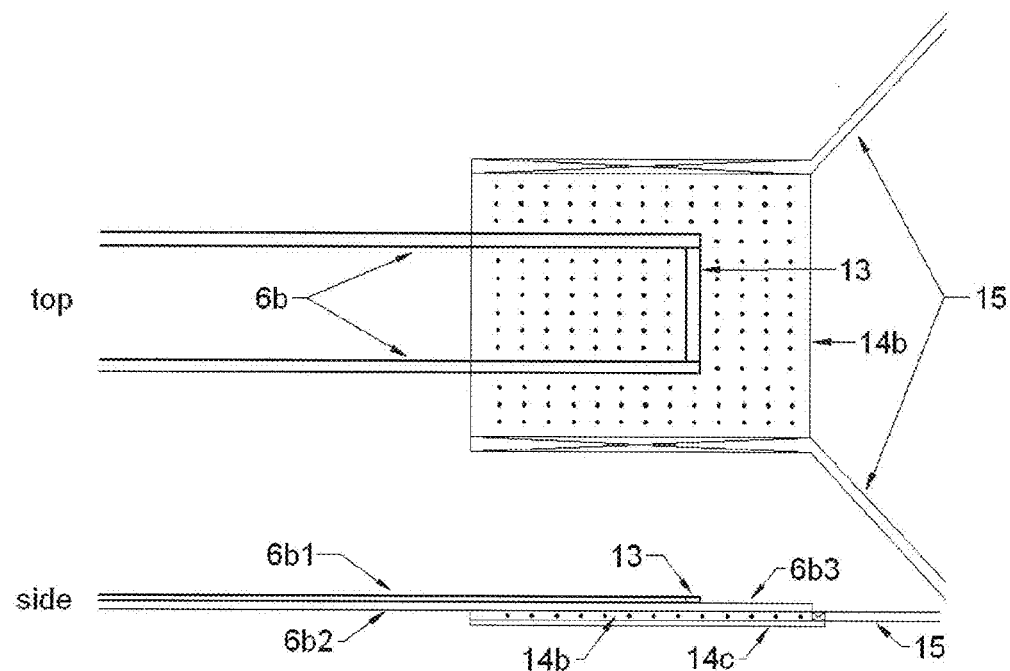
FIG. 13 shows the inclusion of amorphous silicon as a bolometer material.

FIGS. 12 and 13 show two bolometer options. In particular, FIG. 12 shows the inclusion of vanadium oxide as a bolometer material, and FIG. 13 shows the inclusion of amorphous silicon as a bolometer material. Bolometers can be formed on the substrate 11 and coupled to the antenna array. In FIG. 12, the bolometer layout is shown in both a top view and a side view. The antenna load 13 is shown as terminating the ends of the extension 6b. As particular examples, the load 13 can be about 2.5 microns long, about 0.075 microns thick, and about 0.3 microns wide. The material forming the load 13 could be nickel-chrome, and the load 13 can have a nominal resistance of about 500 ohms.

A bolometer 14a in FIG. 12 is formed using vanadium oxide. In the top view, it can be seen that the bolometer material is laid out in a meandering pattern. Additional layers 6b3, 14c in the side view are transparent in the top view to more clearly reveal this pattern. Electrical contacts and leads 15 provide biasing and extraction of a signal from the bolometer 14a. In the side view, it can be seen that the layer 6b3 covers the length of the bolometer material. It also covers the width of the bolometer material and can match the bolometer material in both dimensions. The layer 6b3 is an extension of the twin lead's lower layer 6b2. Also, in the side view, layer 14c represents the support material upon which the vanadium oxide is grown. The layer 14c could represent a layer of silicon oxide or silicon nitride.

In one aspect of operation, signal power captured by a bow tie antenna 3 is routed to the extension 6b and the load 13, which can be warmed (such as through Joule heating). The layer 6b3 helps to keep the bolometer 14a in electrical isolation from the extension 6b and load 13 but also provides close thermal contact. Because of good lateral thermal conduction, the layers 6b3, 14a, 14c can be warmed over their entire areas substantially equally with the extension 6b and the load 13. Assuming that vanadium oxide has a nominal resistivity of about 5 ohm-centimeters and is about 0.2 microns thick, the meander pattern leads to a total resistance between the leads 15 of about $10 \times 10^6$ ohms.

In FIG. 13, the bolometer material is formed by a layer 14b of amorphous silicon. The extension 6b, load 13, and additional layers 6b3 and 14c in FIG. 13 may be the same as or similar to the corresponding components in FIG. 12. The layer 14b here is formed in a continuous sheet, and the conducting contacts and leads 15 for the output signal leads extend along opposite sides of the bolometer material. The contacts and leads 15 are shown in the top view but are transparent in the side view. The operation of the structure in FIG. 13 can be the same as or similar to the operation of the structure in FIG. 12, except the property values of amorphous silicon are different. Assuming that the nominal resistivity of amorphous silicon is about 800 ohm-centimeters and that it is about 0.4 microns thick, the resistance between the leads 15 is about $20 \times 10^6$ ohms.

Referring back to FIG. 9, the bolometer, load, and other layers can be suspended in the middle of the thermal bridge 12 and supported by the extension 6b and the contacts and leads 15. The supporting contacts and leads 15 also allow heat to flow between the bolometer/load and the boundary. The nominal thermal conductivities of the materials in the extensions 6b can include about 0.17 watts/centimeter-K (for titanium) and about 0.014 watts/centimeter-K (for silicon oxide). The effective thermal conductivity for each extension 6b could equal about 0.081 watts/centimeter-K. Each extension 6b can therefore have a thermal conductance $G_L$ of about $8.49 \times 10^{-9}$ watts/K. Assume a thermal conductance $G_{bl}$ for the remainder of the signal lead/bolometer combination of FIG. 13 to be about $4.35 \times 10^{-9}$ watts/K. The total $G_T$ therefore equals about $2.133 \times 10^{-8}$ watts/K (where K stands for degrees Kelvin). Titanium can be used as the conducting material for the twin lead, although other materials may be used. The material forming the upper twin lead layer 6b1 can have a minimum thermal conductivity and a maximum electrical conductivity, and the material can be chosen to minimize the ratio of these two quantities (the Wiedemann-Franz ratio).

Figure 14:
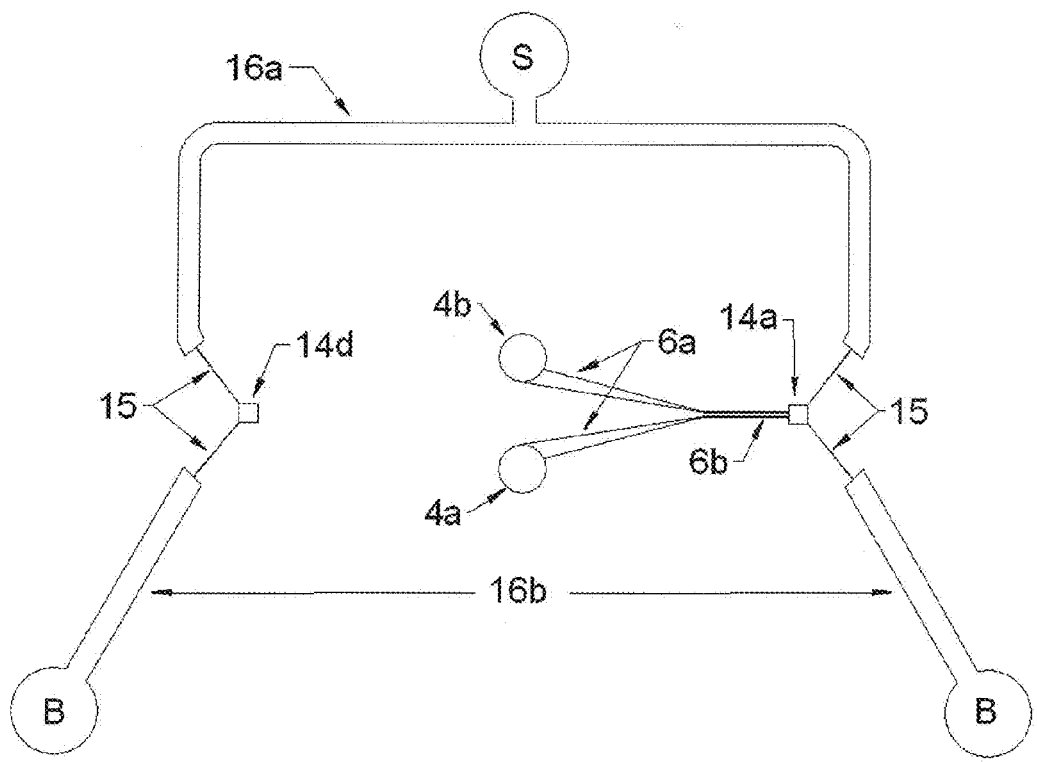
FIG. 14 shows a dual hook-up structure for a bolometer and a matching resistor.

FIG. 14 shows a dual hook-up structure for a bolometer and a matching resistor. Note, however, that arrangements other than that shown could also be used. On the right in FIG. 14 is a bolometer 14a on a thermal bridge (not shown). The bolometer 14a is connected to the antenna posts 4a-4b via the traces 6a and the extension 6b. On the left in FIG. 14 is a resistor 14d, which can have a resistance that substantially matches the resistance of the bolometer 14a. However, the resistor 14d is not located on a thermal bridge or connected to the antenna posts 4a-4b. Instead, the resistor 14d is used to provide balance against a large bias current flowing through the bolometer 14a. A larger structure 16a-16b is a conductor (such as one formed from gold) that allows (i) biasing of the bolometer 14a and the resistor 14d through two lower pads B and (ii) additional circuitry to be connected to a top pad S, such as a capacitive trans-impedance amplifier (CTIA) that extracts a difference in outputs from the resistor 14d and the bolometer 14a. This arrangement can help to cancel unwanted drift and other non-signal fluctuations. In some embodiments, under static conditions, the impedance of the resistor 14d and the bias are chosen to produce a zero potential at the junction between the resistor 14d and the bolometer 14a.

Figure 15:
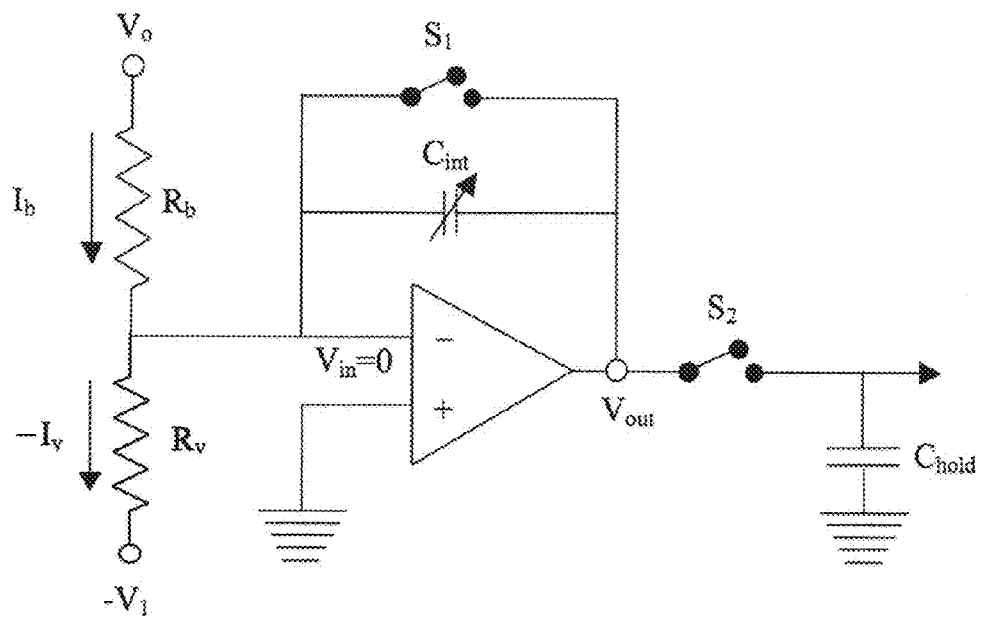
FIG. 15 shows a circuit for extracting a signal from the bolometer and matching resistor.

FIG. 15 shows a circuit for extracting a signal from the bolometer 14a and matching resistor 14d. The bolometer 14a has a resistance $R_b$, a constant bias voltage $V_o$, and a current $I_b$. Below that is a resistor $R_v$ with a constant bias voltage $-V_1$ and current $-I_v$. In the middle of FIG. 15 is a trans-impedance amplifier with capacitive feedback. The output of the amplifier goes to a holding capacitor $C_{hold}$, which couples into readout circuitry. In this arrangement, the trans-impedance amplifier represents a current reading device. The resistor $R_v$ here is used for balancing current from the bolometer 14a and represents the resistor 14d.

The following mathematically describes example operations of components in a particular implementation of a terahertz camera with antenna and bolometer arrays. Other implementations could differ from this mathematical description. The total current input into the trans-impedance amplifier in FIG. 15 can be expressed as:

$$I_v + (I_b^o + \Delta I_b^1 + \Delta I_b^2)$$

where $I_b^o$ is the bias value of the bolometer current without external input from a scene, $\Delta I_b^1$ is due to input from a background in the scene, and $\Delta I_b^2$ is due to a change in the scene features. The peak value of the amplifier's voltage output can be expressed as $1/C_{int}$ times the charge accumulated on the hold capacitor over a time $t_{int}$. When $I_b^o = -I_v$, this can be expressed as:

$$V_{out}^{peak} = \frac{1}{C_{int}} \int_0^{\tau_{int}} (\Delta I_b^1 + \Delta I_b^2) dt$$

Only a change in $R_b$ manifested by input from a scene appears in the peak value of the output. This serves the performance of the bolometer 14a as described below.

The bolometer 14a can have a high impedance to allow for a substantially constant voltage bias. Assume that the bolometer 14a is in a biasing circuit and placed on the thermal bridge 12. The static heat balance equation can (dropping the subscript $_b$ for the current I) be given by:

$$IV + P_r = G[(T - T_{Joule}) + (T_{Joule} - T_o)]$$

The temperature of the bolometer 14a can be dictated, at least in part, by Joule heating (IV) from the circuit, the collected (signal) power $P_r$ absorbed by the bolometer 14a, and the thermal conductance G (in watts/K) to the local environment. Here, T is the equilibrium temperature of the bolometer 14a, $T_{Joule}$ is the temperature brought about by Joule heating, and $T_o$ is the reference or local environment temperature. Also, V is the voltage spanning the bolometer 14a, and I is the current. The contribution to T from static absorbed power only can be isolated as follows:

$$P_r = G(T - T_{Joule})$$

The temperature rise divided by the absorbed power can be expressed as:

$$\frac{T - T_{Joule}}{P_r} = \frac{1}{G}.$$

The consequences of a change in absorbed power $\Delta P_r$ can be considered using the derivative of the static heat balance equation:

$$\Delta V = I \Delta R_b + R_b \Delta I$$

plus the expression for the thermal responsivity ($\alpha$):

$$\alpha = \frac{1 \Delta R_b}{R_b \Delta T}$$

where $R_b$ is the bolometer's resistance. With $\Delta V = 0$ (constant voltage bias), the change in temperature $\Delta T$ of the bolometer 14a per unit change in the absorbed power $\Delta P_r$ becomes:

$$\frac{\Delta T}{\Delta P_r} = \frac{1}{G + \alpha IV} = \frac{1}{G_{eff}}$$

where $G_{eff}$ is the effective thermal conductance for a non-static case.

A current responsivity, which is the change in current $\Delta I$ per unit change in the absorbed power $\Delta P_r$, may be derived as follows:

$$\frac{\Delta I}{\Delta P_r} = \mathfrak{R} = \frac{-\alpha I}{G_{eff}}$$

where $\mathfrak{R}$ represents the current responsivity. As a practical matter, for a source to maintain a constant voltage ($\Delta V = 0$) under changing loads, the following may be used:

$$\frac{NR_{int}}{R_b} \ll 1$$

where N represents the number of bolometers 14a served, and $R_{int}$ is the internal resistance of the source. When $R_b = 9.7 \times 10^6$ ohms (for amorphous silicon) and $N = 7,000$, $R_{int} \ll 1386$ ohms. For vanadium oxide, it would be approximately half that value. For a battery source, this can be easily achieved. Note that with a negative $\alpha$ (as is the case with most bolometer materials), $\mathfrak{R}$ not only rises directly with the current I but also with the diminishing value of $G_{eff}$. $\mathfrak{R}$ theoreticlly becomes infinite when $G + \alpha IV = 0$.

In one approach, advantage is taken of $G_{eff}$ in the performance of the bolometer 14a. This approach and the exploitation of $G_{eff}$ are not used in conventional uncooled IR imagers since direct illumination of a bolometer material and other factors impose restrictions that make it generally impractical. For detectors designed in accordance with this disclosure, the noise-equivalent power NEP and the noise-equivalent temperature change NEDT detected in a scene are related:

$$\frac{\Delta \Phi}{\Delta T_{sc}} NEDT' = NEP'$$

where $$\frac{\Delta \Phi}{\Delta T_{sc}}$$

is the change in power ($\Delta \Phi$) from the scene with respect to its change in temperature ($\Delta T_{sc}$). To a good approximation, $$\frac{\Delta \Phi}{\Delta T_{sc}} \cong \eta k B_{eff}$$

for a single polarization captured by an antenna at terahertz frequencies, where k is Boltzmann's constant ($1.38 \times 10^{-23}$ J/K), $B_{eff}$ is the effective terahertz bandwidth, and $\eta$ is the optics-to-antenna receiver throughput efficiency. Values for $B_{eff}$ and $\eta$ are based on the antenna design. Therefore, as a principal performance parameter of the detector:

$$NEDT' = \frac{NEP'}{\eta k B_{eff}}$$

The "prime" symbols are used here as a reminder that these quantities refer to changes in the scene (their static quantities are different).

To minimize NEDT', a minimum NEP' and a maximum $B_{eff}$ can be used. There are two noise sources commonly associated with the properties of conventional bolometer materials, namely Johnson noise and 1/f noise. A third noise source also comes from the exchange of heat (phonons) between the bolometer and its surroundings, which is referred to as thermal or temperature fluctuation noise. Both Johnson noise and thermal noise are white noise sources, meaning their noise spectra are substantially flat over a large frequency range. Using the responsivity $\Re$ (T) previously derived, the NEP' for Johnson noise (where the dependence of $R_b$ and $\alpha$ on T is acknowledged) can be given by:

$$NEP_{noise}^{Johnson} = \frac{-G_{eff}}{\alpha(T)I} \sqrt{\frac{4kT\Delta f}{R_b(T)}}$$

The NEP for thermal (phonon exchange) noise can be given by:

$$NEP_{noise}^{phonon} = \sqrt{4kT^2 G_{eff} \Delta f}$$

where $\Delta f$ is the signal bandwidth. 1/f noise is power or "colored" noise, meaning its noise spectrum is not substantially flat over a large frequency range. The NEP for 1/f noise can be given by:

$$NEP_{noise}^{1/f} = \frac{-G_{eff}}{\alpha(T)} \sqrt{\frac{K'}{v} \ln\left(\frac{f_2}{f_1}\right)}$$

where v is the volume of the bolometer, and $f_1$ and $f_2$ span the frequency band $\Delta f$. The noise spectrum is not flat but rises as the frequency decreases. K' has the dimension of volume but is independent of volume. For both vanadium oxide and amorphous silicon:

$$K' \cong 7.5 \times 10^{-23} \text{ cm}^3$$

The dependence of T, $R_b$ and $\alpha$ on the bias current I can be expressed as follows. For semiconductors like amorphous silicon:

$$T = T_o + \frac{I^2 R_o}{G} e^{\alpha_o T_o \left(\frac{T_o}{T} - 1\right)}$$

$$R = R_o e^{-\alpha_o T_o \left(\frac{T_o}{T} - 1\right)}$$

$$\alpha = \alpha_o \left(\frac{T_o}{T}\right)^2$$

Here, $R_o$ and $\alpha_o$ are the initial values of $R_b$ and $\alpha$ at zero bias, and $T_o$ is the temperature of the environment (room temperature). Total NEP from the contributions described above plus those from the receiving circuitry can be expressed as follows:

$$NEP_{noise}^{total} = \left[(NEP_{noise}^{Johnson})^2 + (NEP_{noise}^{1/f})^2 + (NEP_{noise}^{phonon})^2 + (NEP_{noise}^{circuit})^2\right]^{1/2}$$

$$NEP_{noise}^{circuit} = 5 \times 10^{-13} \frac{G_{eff}}{\alpha I_b} *$$

(* from CTIA-equivalent input noise current).

Figure 16:
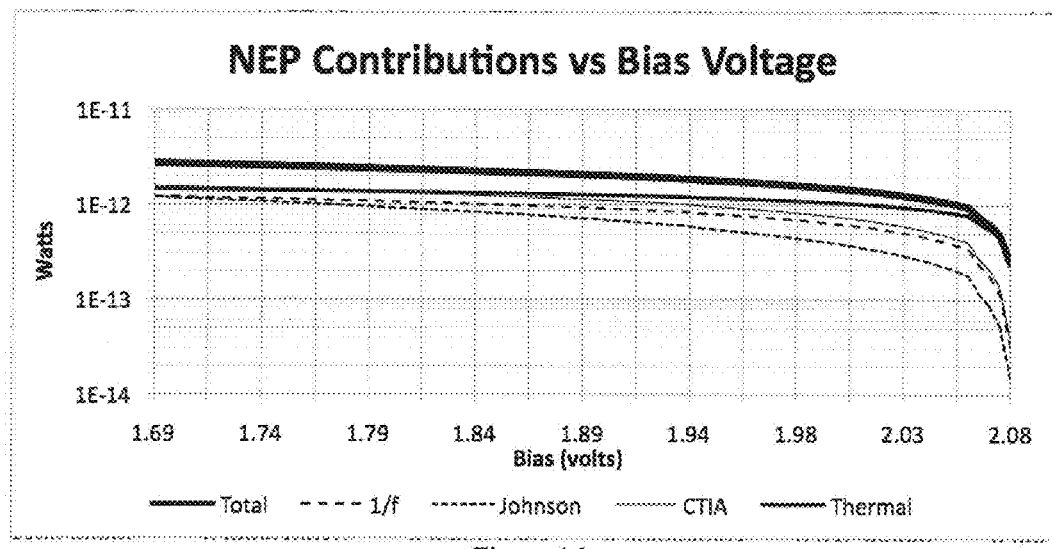
FIG. 16 shows a chart illustrating noise-equivalent power (NEP) of the bolometer versus bias voltage.

In the above, the resistor $R_v$ (resistor 14*d* in FIG. 14) is included in the 1/f noise and the Johnson noise. Assume the bolometer material is amorphous silicon and the following input numbers are selected:

$T_o$=295K
$R_o$=20×10$^6$ ohms
$R_v$=9.7×10$^6$ ohms
$\alpha_o$=−0.04K$^{-1}$
G=2.133×10$^{-8}$ W/K
K'=7.5×10$^{-23}$ centimeters$^3$
v=2.9×10$^{-11}$ centimeters$^3$
$\Delta f$=30 Hz, $\tau_{int}$=33 milliseconds
$f_1$=1 Hz and $f_2$=30 Hz FIG. 16 shows a chart illustrating noise-equivalent power $NEP_{noise}^{total}$ and its components of the bolometer 14*a* versus bias voltage. Although not plotted, the bolometer temperature rises slowly with bias voltage until a threshold is reached (such as about 2.08 volts), at which point it rises very rapidly and the bolometer self-destructs. Near the destruction point, the total NEP' becomes limited by the thermal NEP'. Prior to that, all NEP'components may fall with bias and fall more rapidly as the destruction point is approached. The value of the total NEP' immediately prior to the destruction point may be about 5×10$^{-13}$ watts. Noise from the various sources (thermal, 1/f, and Johnson) may rise with bias, but the responsivity can rise faster, leading to a reduction in the noise sources' NEP'. If choosing a bias of 2 volts, for example, the bolometer temperature T rises from its initial value of about 295 K to about 314 K, the bolometer resistance $R_b$ falls from its initial value of about 20 MΩ to about 9.7 MΩ, and $\alpha$ falls from its initial value of about −0.04 K$^{-1}$ to about −0.0352 K$^{-1}$.

This is therefore a tightly coupled thermal/electrical circuit that exhibits positive feedback. For the feedback to be effective, the total time between samplings can equal or exceed the time for the thermal/electrical circuit to respond. One measure of this time is the bolometer/bridge thermal time constant $\tau_{th}$, which can be expressed as:

$$\tau_{th} = \frac{C}{G_{eff}}$$

where C is the effective thermal mass of the bolometer and bridge support. Referring back to FIG. 13, the calculated total effective thermal mass for the twin lead, load, bolometer, and signal leads could be estimated at just under 4×10$^{-11}$ Joules/K. At a bias of 2 volts, the effective thermal conductance $G_{eff}$ can be about 6.78×10$^{-9}$ Watts/K, and the thermal time constant $\tau_{th}$ is therefore about 5.9×10$^{-3}$ seconds.

Besides being independent of changes in load, the bias voltage V remains substantially stable during operation of a bolometer. Note that the bias voltage V can be varied to different settings based on desired operation of the bolometer, and the bias voltage V can remain substantially constant at each setting (independent of changes in the bolometer). From FIG. 16, if any operating bias near but short of the destruction point is chosen, analysis shows that (for a specific implementation) any instability in V may be kept below 2×10$^4$ volts in order to keep the fractional change in the responsivity $\Re$ (T) at less than 1%. Referring again to FIG. 16, at an operating bias of 2 volts, the total NEP' is about 1.5×10$^{-12}$ watts. At a slightly higher bias value of 2.06 volts, the total NEP' is about 1.0×10$^{-12}$ watts, and the bias voltage stability requirement remains at 2×10$^{-4}$ volts. Here, $G_{eff}$ is about 3.82×10$^{-9}$ W/K, and the thermal time constant $\tau_{th}$ is about 10.5×10$^{-9}$ seconds. How close to the destruction point one operates can be determined using routine experimentation, although non-uniformity of detectors in an array can affect that.

Figure 17:
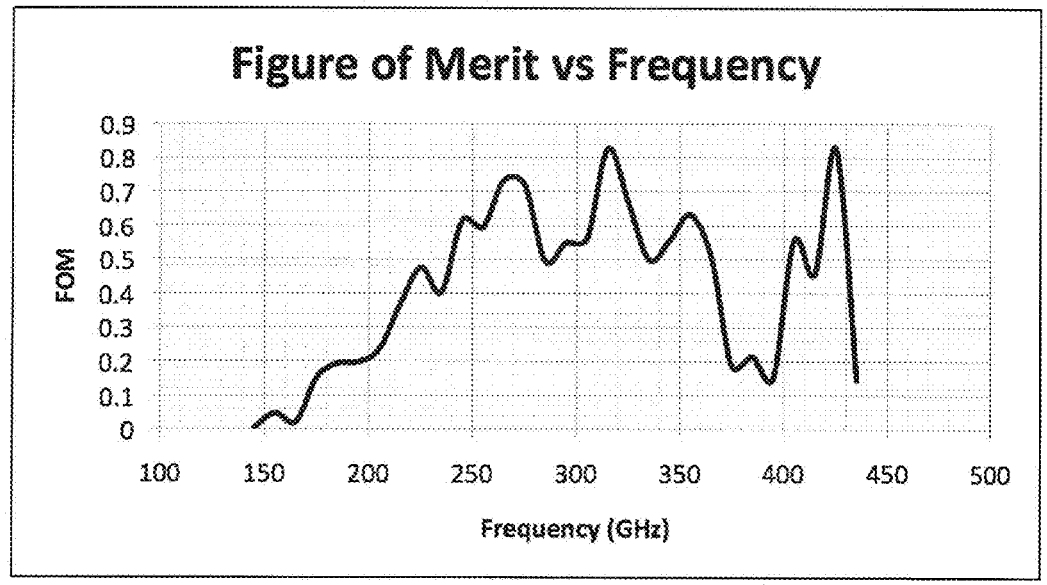
FIG. 17 shows a chart illustrating receiver figure-of-merit versus frequency.

The structure described in FIGS. 1 through 11 can be inherently broadband. For one specific implementation of this structure, a 3D finite-element CAD simulator was used to simulate the delivery of input radiant power to antennas and their loads via f/0.95 to f/0.8 imaging systems over a terahertz spectral range from about 150 GHz to about 450 GHz. Solutions were obtained at discrete frequencies throughout the range. A figure-of-merit was derived for each frequency. FIG. 17 shows a chart illustrating receiver figure-of-merit versus frequency. In particular, FIG. 17 is a plot of the figure-of-merit versus frequency for the case of a quartz glass bolometer substrate.

From this, an effective bandwidth can be derived corresponding to a unity figure-of-merit and power delivered to the loads with an efficency η of 50% (the maximum for an imaging system feeding a receiving antenna in its focal plane). The effective bandwidth could be about 125 GHz with a nominal center frequency of about 300 GHz. Referring back to FIG. 16 and the choice of a 2 volts bias, $NEP_{noise}^{total}$ from the chart is about $1.5 \times 10^{-12}$ watts as previously stated. Combined with an effective bandwidth of about 125 GHz and a throughput efficiency η of 50%, this gives an NEDT' of about 1.74 K at 30 Hz. If 2.06 volts can be used successfully, the NEDT' would be about 1.163 K at 30 Hz.

Figure 18:
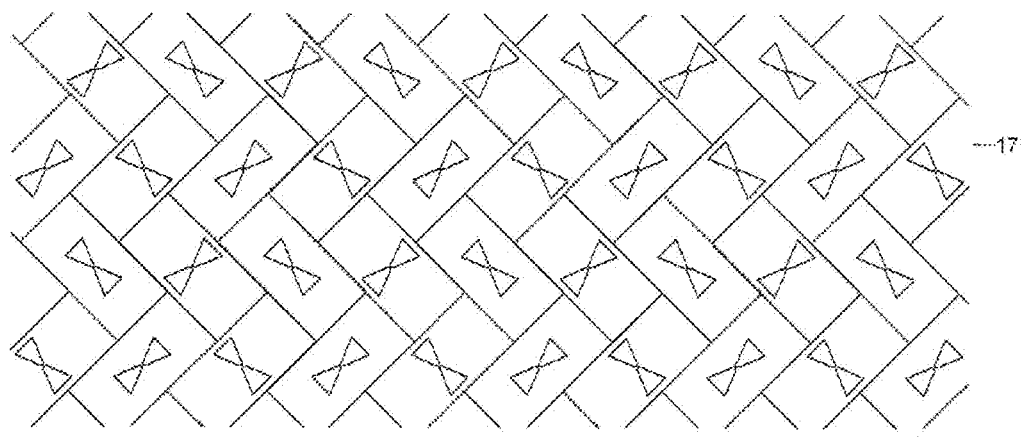
FIG. 18 shows a staggered version of the array from FIG. 4.

In the following, assume a bias of 2 volts. Referring back to FIG. 4, the spacing between antenna centers can be about 1.5 millimeters as defined by the horn receivers' dimensions. For a staring array, the angular resolution can be set by the detector spacing, provided a diffraction limit is compatible. FIG. 18 shows an array 17 representing a staggered version of the array from FIG. 4. The array 17 has a somewhat tighter arrangement of horn receivers and antennas. For simplicity, the horn receivers are shown as blocks, which are at ±45° angles and staggered. In some embodiments, the spacing between receivers is about 1.414 millimeters both horizontally and vertically.

Figure 19:
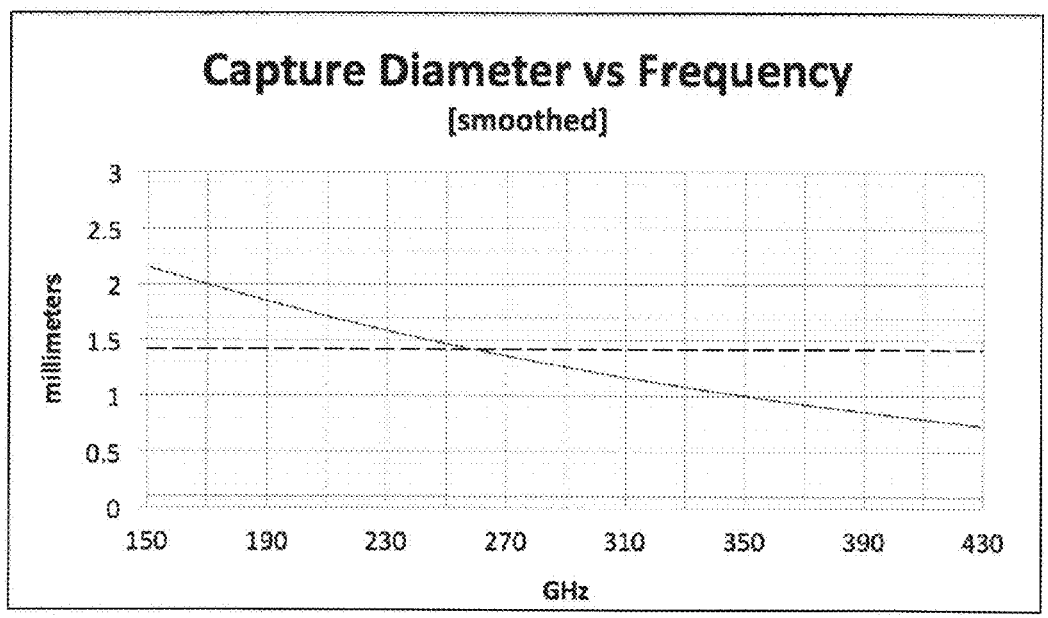
FIG. 19 shows a chart illustrating capture diameter versus frequency of the horn receiver/bow tie antenna combinations in the array.
Figure 20:
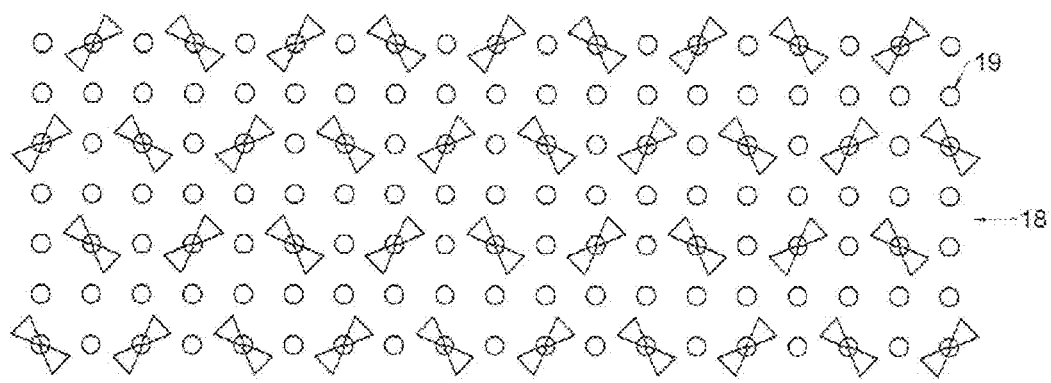
FIG. 20 shows the staggered array of FIG. 18 with image sampling centers.

FIG. 19 shows a chart illustrating capture diameter versus frequency of the horn receiver/bow tie antenna combinations in an array. The dashed line in FIG. 19 is a 1.414 millimeter spacing. At lower frequencies, the capture diameter is much larger. Despite that, there is little mutual interference because of the cross-polarization of adjacent receivers. As might be expected, for frequencies above about 230 GHz, the capture diameter is less than the spacing. One can use this as it is and take a loss in filling factor for the higher frequencies, or one can take advantage of the staggered array in FIG. 18 and step the image. FIG. 20 shows an array 18 with the same arrangement, where bow tie antennas are used as site markers and small circles 19 indicate the desired sampling of the image. The circles 19 could be about 0.707 millimeters apart in some embodiments.

Now consider the following dither sequence. With the staggered antenna array 18 of FIG. 20 fixed, the image is sampled, moved up two steps relative to the antenna array (described below), and sampled at each step. The image is then re-sampled at two steps going down and back to the original position and then sampled again. This can be repeated, moving down and back up, except the original position is not sampled again. When this is done, the image has been sampled eight times, but each circle has been sampled twice (by three antenna sites). This scales to four steps needed to sample all circles once. One advantage here is that the dithering need only be along one direction. An alternative would be to move the image horizontally one step and back and then vertically one step and back (or vice versa) for dithering in multiple directions. In some embodiments, it may take about 0.133 seconds to completely sample an image for an NEDT' of 2.18K.

Referring again to FIG. 19, a camera aperture can be used that supports a diffraction-limited resolution at least comparable to the capture diameter. For example, by choosing an f/0.8 optical system and a 610-millimeter imaging aperture (24 inches), the nominal diffraction-limited resolution at the focal plane for 430 GHz is about 0.71 millimeters (~Rayleigh). This can be compared with the capture diameter at 430 GHz of about 0.7 millimeters. This gives an angular resolution of about $1.75 \times 10^{-3}$ radians.

As additional options and with additional manipulation of the structure (such as by using a finite-element CAD simulator), it is possible to narrow the figure-of-merit response over that shown in FIG. 17 and keep the same effective bandwidth. For example, a first step could include creating a greater representation in the frequency range of about 200 GHz to about 300 GHz and reducing or eliminating the response in the range of about 400 GHz to about 450 GHz. The upper value may be confined to about 370 GHz. In this case, as a modification of the arrangement in FIG. 18, the nearest-neighbor horn receivers could be aligned horizontally and in parallel, the vertical spacing could be about 1 millimeter, and the horizontal spacing could be about 2 millimeters. To achieve a 1-millimeter sampling in both directions, a two-step horizontal dither can be used. Selecting a 20-inch aperture and f/0.95 optics can result in an angular resolution of about $2 \times 10^{-3}$ radians. The weight of the system could decrease (such as to around 10 pounds).

A second step could include further increasing the representation in the range from about 200 GHz to about 300 GHz and confining the upper frequency to about 320 GHz. The pitch can again be about 1 millimeter in both directions using a two-step vertical dither. With f/0.83 optics, this can allow the aperture to shrink to 12 inches. A blur diameter of 1 millimeter at the focal plane becomes equal to the capture diameter at about 320 GHz (see FIG. 19), and the angular resolution becomes about $3.9 \times 10^{-3}$ radians, which is again dictated by the pitch of the horn receivers. In some embodiments, it could take about 0.066 seconds to completely sample an image with an NEDT' of 2.18K. This system could have further reductions in weight (such as to about 3-5 pounds). However, there can be a lower limit to the pitch. For example, whatever the pitch, the size of the thermal bridge 12 that supports the bolometer 14a and load 13 and the size of vacuum ports (described below) may remain the same. These are offset from beneath the antenna arms 3a-3b, so there is less available space as the pitch is lowered.

Figure 21:
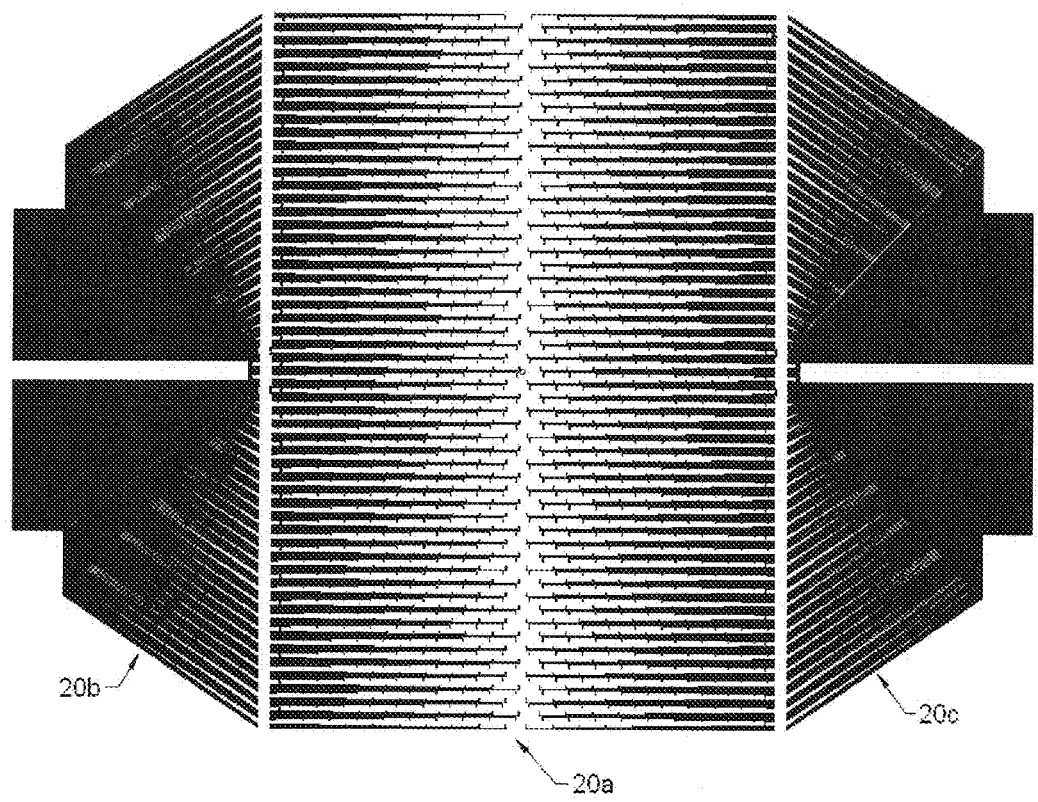
FIG. 21 shows a manifold of thin traces that connect outputs from members of the array to inputs of readout integrated circuits (ROICs)

Standard or custom readout circuits can be used to extract data from these types of arrays. For example, readout integrated circuits (ROICs) developed for infrared imaging systems could be used. FIG. 21 shows a manifold of thin traces that connect outputs from members of the array to inputs of ROICs. The approach here is to route outputs of the bolometers to a common area using the manifold of signal traces, where the manifold converges to match the pitch of the ROIC(s). The biasing of the bolometers can be done similarly, leading to single contacts for plus and minus applied voltages. In other words, one manifold can be used to connect the bolometers to the ROICs, and another manifold can be used to connect the bolometers to bias inputs. The different manifolds can be shielded from one another by a second ground plane.

Figure 22:
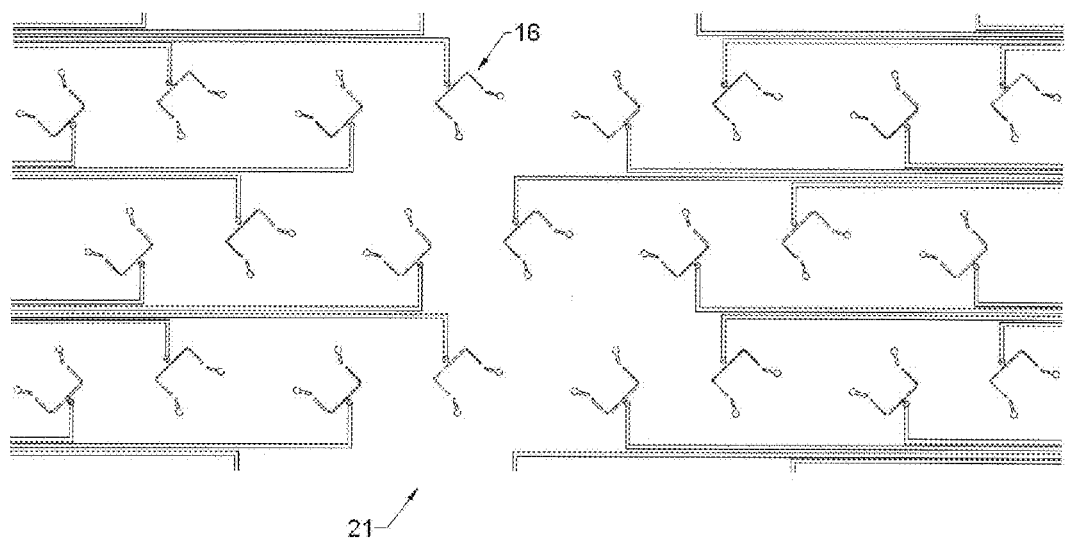
FIG. 22 shows a highly magnified view of a middle section of the manifold with the dual hook-up structures included.

In this example, the signal manifold includes three sections 20a-20c. The sections 20a-20c are electrically connected but are slightly separated from each other in the drawing for clarity. For the particular case shown, the traces in section 20a extend from 2,048 individual detector sites in the middle to the edges of the section 20a on either side. FIG. 22 shows a highly magnified view 21 of the middle section 20a of the manifold with the dual hook-up structures 16 included. The middle section 20a of FIG. 21 can have any suitable dimensions, such as about 2 inches by about 3 inches.

Figure 23:
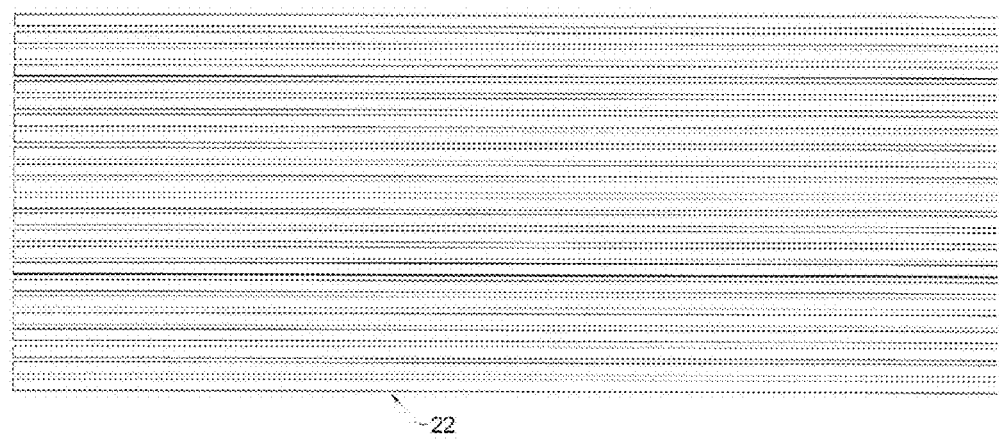
FIG. 23 shows a highly magnified view of output pads that match a pitch of the integrated circuit inputs.

In sections 20b-20c of FIG. 21, the traces are picked up from the middle section 20a and routed to four groups of ROIC pads, two on the left and two on the right. In FIG. 21, the individual horizontal pads are unresolved. FIG. 23 shows a highly magnified view of output pads 22 that match a pitch of the integrated circuit inputs. The pitch could have any suitable value, such as about 25 microns. There could be four linear ROICs, each with 512 inputs positioned over the four sets of output pads.

Figure 24:
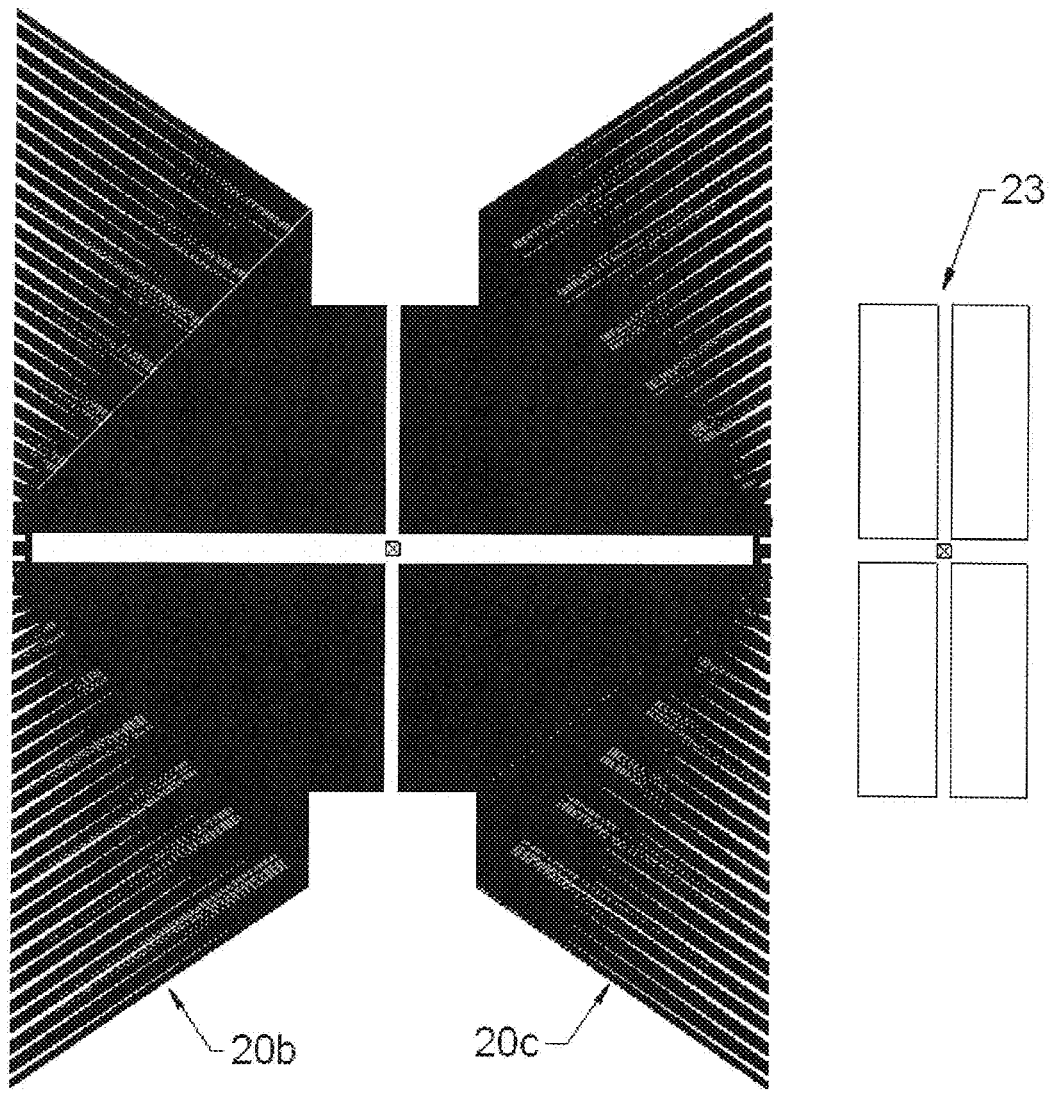
FIG. 24 shows outer parts of the manifold that are folded together and placed on a backside of a bolometer substrate, with outlines of the ROICs seen on the side.

Referring again to FIG. 21, it can be seen that sections 20b-20c take up considerable room. To help confine the overall profile to that of the array itself, other configurations can be used. For example, FIG. 24 shows outer parts of the manifold that are folded together and placed on a backside of a bolometer substrate, with outlines of the readout integrated circuits seen on the side. The sections 20b-20c have been folded 180° and are placed on the back of the bolometer substrate. Small vias (not shown) can be inserted through the substrate to connect the sections 20b-20c with the section 20a. There may be 2,048 vias (1,024 on each side). In FIG. 24, four blocks 23 on the right represent four ROICs. In the drawing, they are displaced from their correct position in the center of the folded sections 20b-20c so they can be seen more clearly. The markers [x] represent common center positions. In particular embodiments, a suitable linear ROIC with CTIA inputs is an ISC9802 standard 512 linear array from INDIGO SYSTEMS CORP. (with the ROIC outputs reordered for display).

Figure 25:
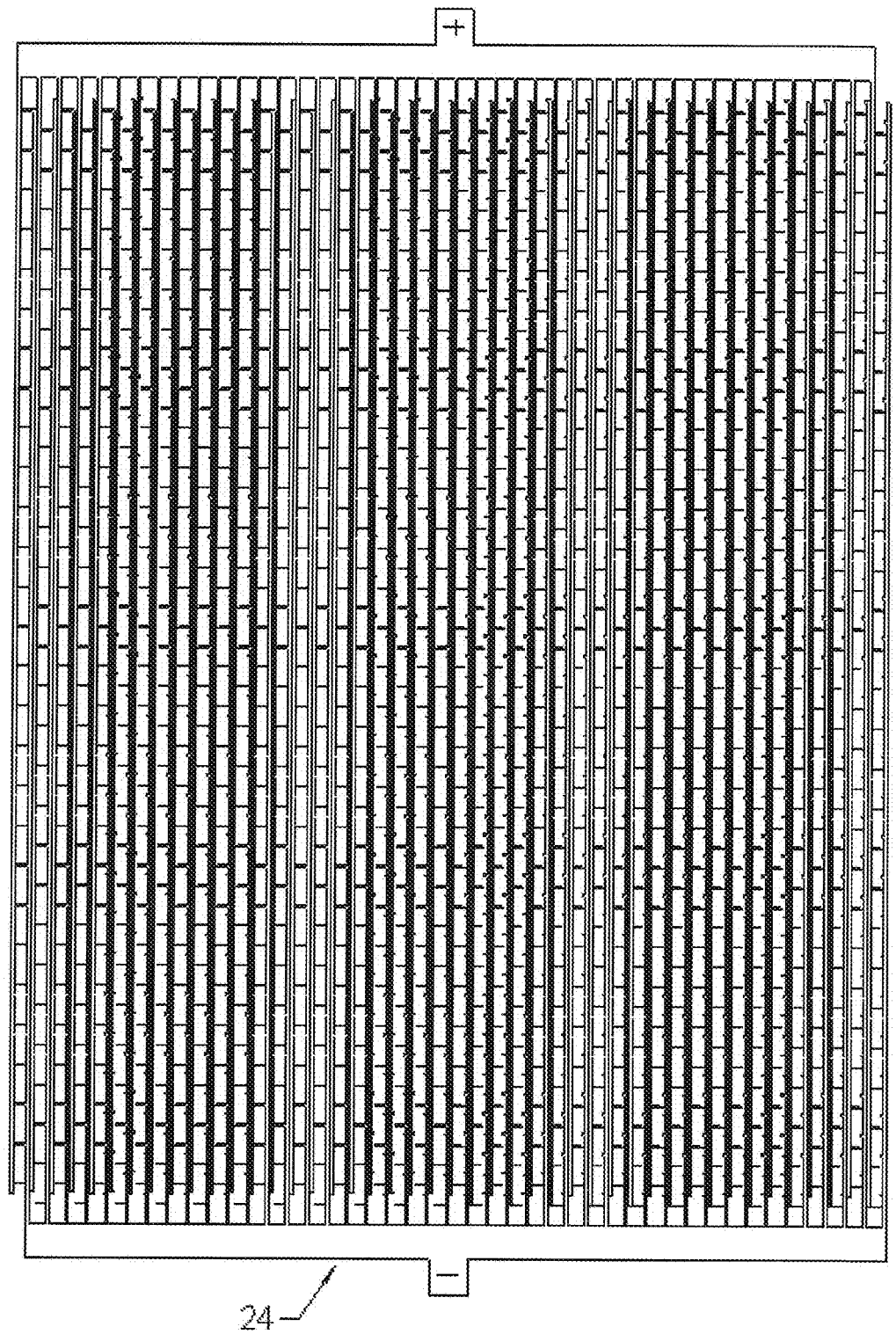
FIG. 25 shows traces for biasing the bolometers using two contacts.
Figure 26:
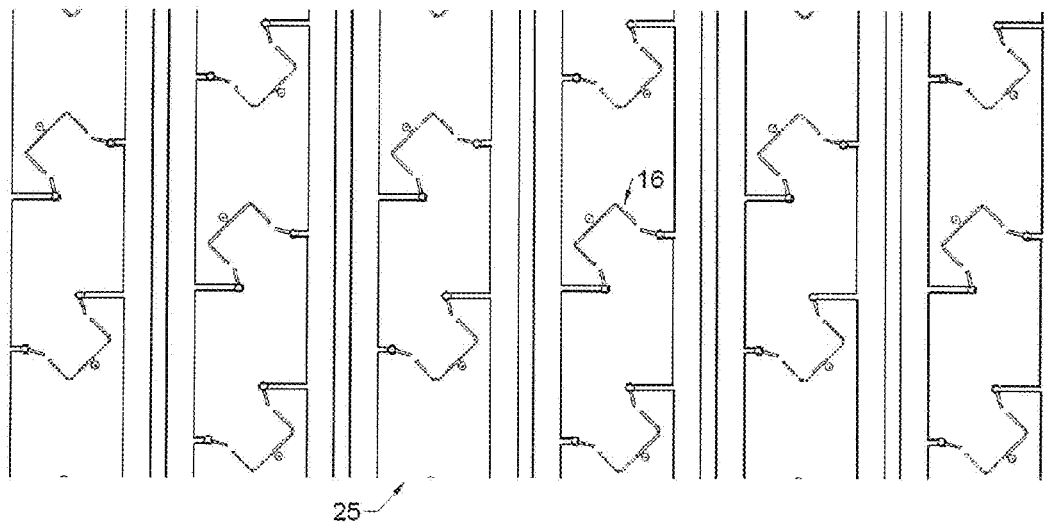
FIG. 26 shows a highly magnified view of bias lines with hook-up structures included.

FIG. 25 shows traces for biasing the bolometers using two contacts. In particular, FIG. 25 shows an overall layout of bias lines 24. The (+) and (−) pads are the bias voltage inputs. FIG. 26 shows a highly magnified view 25 of bias lines 24 with hook-up structures 16 included. The traces manifold and the bias lines can be at different levels on a substrate, and a ground plane (not shown) can separate them for shielding purposes. The traces can have relatively low resistances (such as up to several hundred ohms), which lends the system to negligible cross-talk and interference.

FIGS. 27 through 39 represent a sequence of steps for fabricating an antenna array part of a terahertz focal plane array. Note, however, that other approaches could be used to fabricate the same or similar structure.

Figure 27:
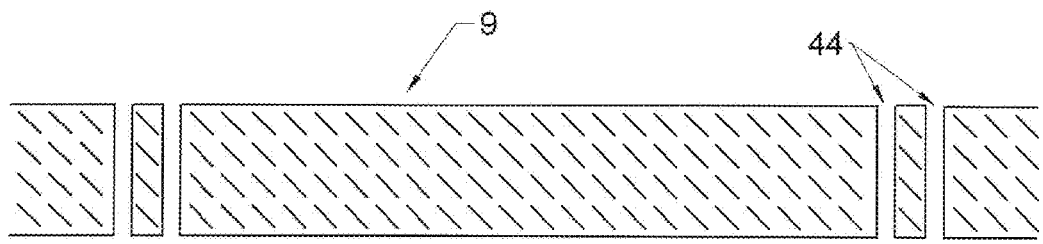
FIGS. 27 through 39 represent a sequence of steps for fabricating an antenna array part of a terahertz focal plane array.

FIG. 27 shows a side view of a z-cut wafer of crystalline quartz 9 (the z direction is vertical here and is parallel with the thickness dimension of the wafer). Terahertz feed holes 44 are etched in the wafer, such as through chemical or laser etching. The wafer of crystalline quartz 9 could be about 147.5 microns thick, and the holes 44 could be about 25 microns in diameter. A mask material for etching the quartz 9 could include nickel/gold, and DUPONT photolithographic film or its equivalent could be used for patterning. The film could be a negative resist material and bridge over gaps in the quartz 9. To etch the holes 44, chrome/gold can be deposited (such as a few thousand Angstroms thick) on the wafer and patterned to mask all but the prospective hole areas. The wafer can be etched in a mixture of hydrofluoric acid (HF) and ammonium fluoride ($NH_4F$). The etch rate can be determined by the temperature of the bath, and a fast etch can occur in the z direction. Z-cut crystalline quartz may be selected for use since it may have no observable loss in the z direction over the frequency range being used and its asymmetric etching properties facilitate micro-machining and segmentation.

Figure 28:
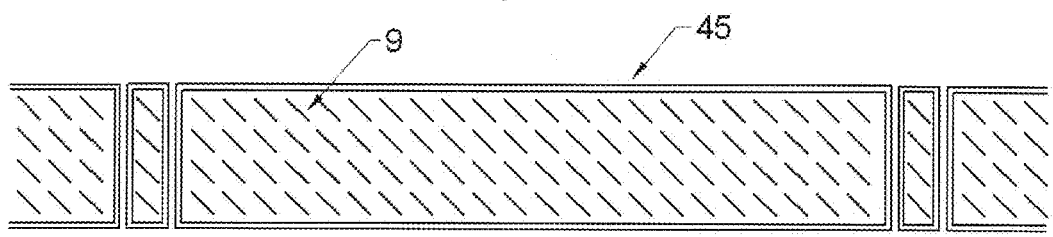

As shown in FIG. 28, surfaces (including hole surfaces) are plated with conductive material 45. The material 45 could include nickel/gold and have a thickness of about 10 microns. The material 45 can be deposited in any suitable manner, such as by using electro-less plating. The pre-existing chrome/gold mask may be removed or left on the structure. The material 45 can serve as a subsequent mask. It can also constitute the ground plane 2 with its irises and the antennas and their terahertz vias.

Figure 29:
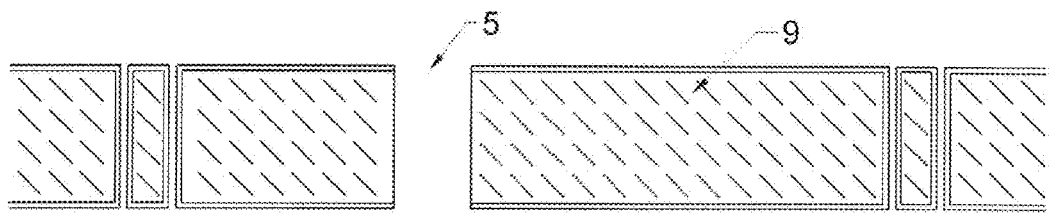
Figure 30:
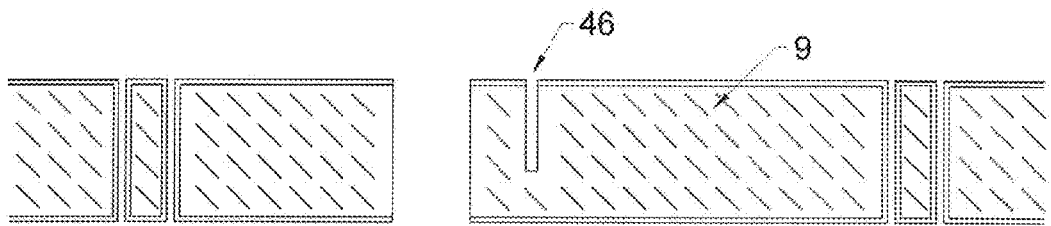

As shown in FIG. 29, vacuum ports 5 are created. For example, holes of suitable diameter (such as about 150 microns) can be opened in the nickel/gold, and the z-cut quartz 9 can be etched. As shown in FIG. 30, dicing slots 46 are partially created in the structure. Any suitable etching or other operations could be used to form the vacuum ports 5 and the dicing slots 46.

Figure 31:
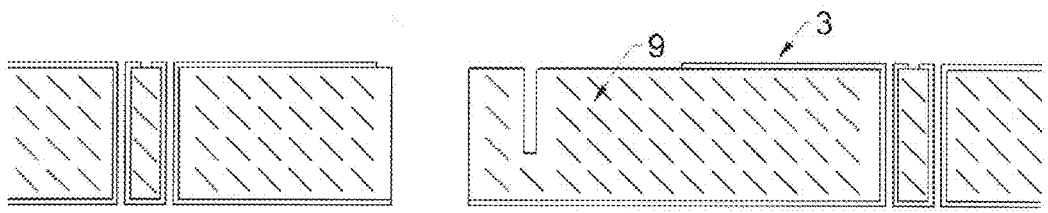
Figure 32:
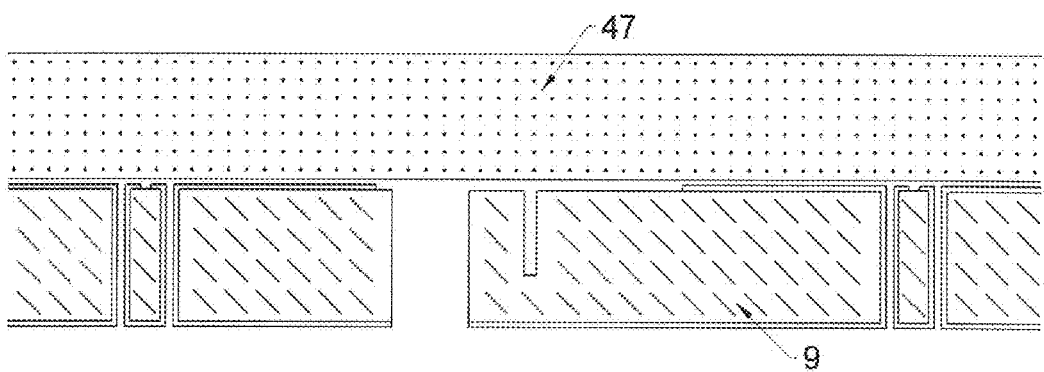
Figure 33:
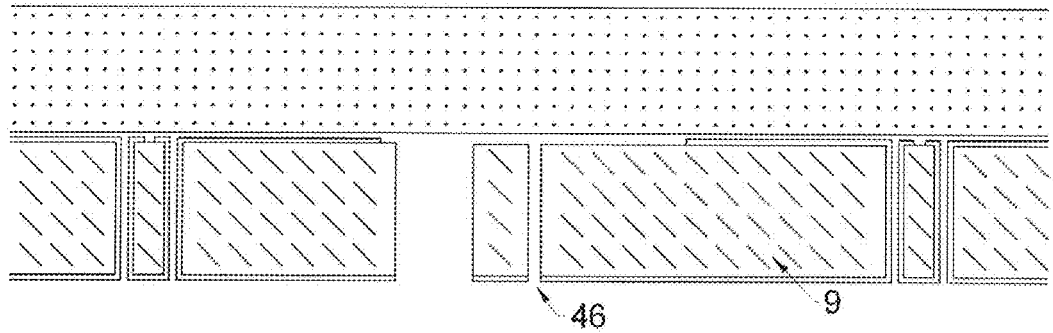
Figure 34:
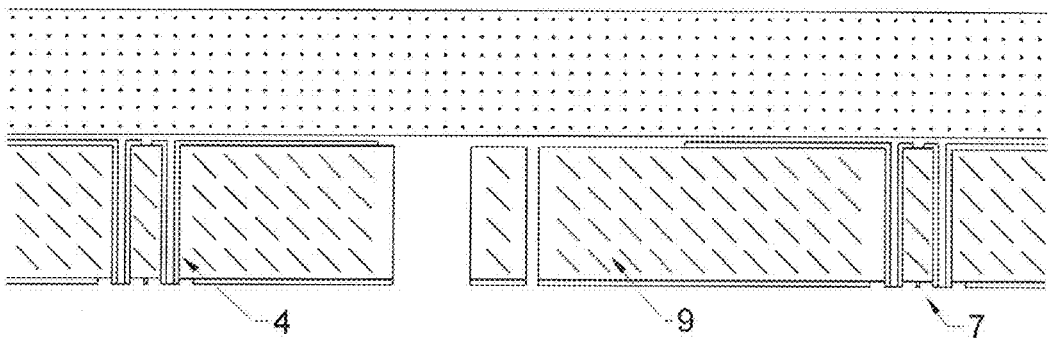

As shown in FIG. 31, the antennas 3 are formed on the structure. This could be accomplished, for example, by patterning and etching the material 45 on top of the quartz 9. As shown in FIG. 32, a support wafer 47 is attached to the antenna side of the quartz wafer. Any suitable attachment could be used here, such as wax bonding. As shown in FIG. 33, formation of the dicing slots 46 through the wafer is completed, such as by performing another etching or other operation. As shown in FIG. 34, irises 7 are etched in the material 45 on bottom of the wafer (where that material represents the ground plane 2).

Figure 35:
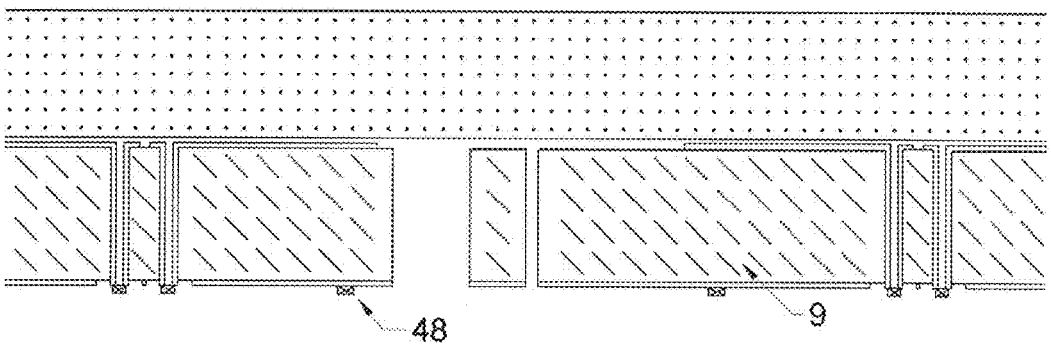
Figure 36:
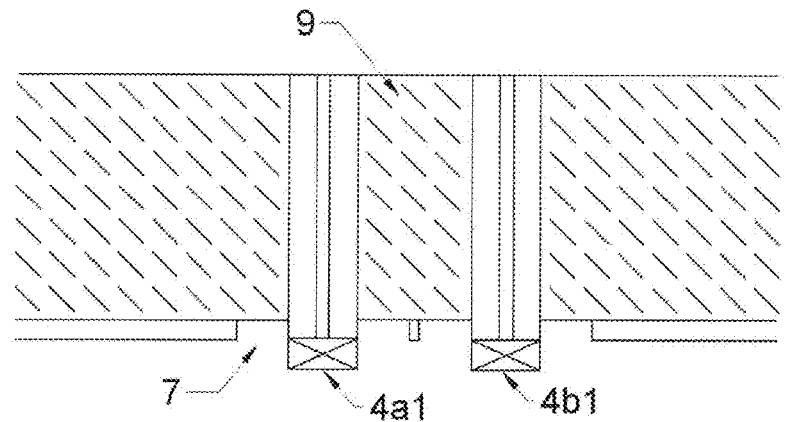

As shown in FIG. 35, solder bumps 48 are added on the material along the bottom of the quartz wafer. FIG. 36 is a magnified view of a pair of solder bumps (forming the extensions 4a1-4b1) under the antenna posts. The gold plating or other material 45 can fill any suitable amount of each hole through the wafer, such as between 96%-100% of the hole's volume. The solder bumps here can provide good RF contact while reducing or preventing lateral expansion from encroaching into the irises 7. In some embodiments, with reasonably high tin content in the solder bumps, there may be no appreciable degradation in performance. Additional solder bumps (used away from the output posts 4a and 4b) can be used for securing the bond.

Figure 37:
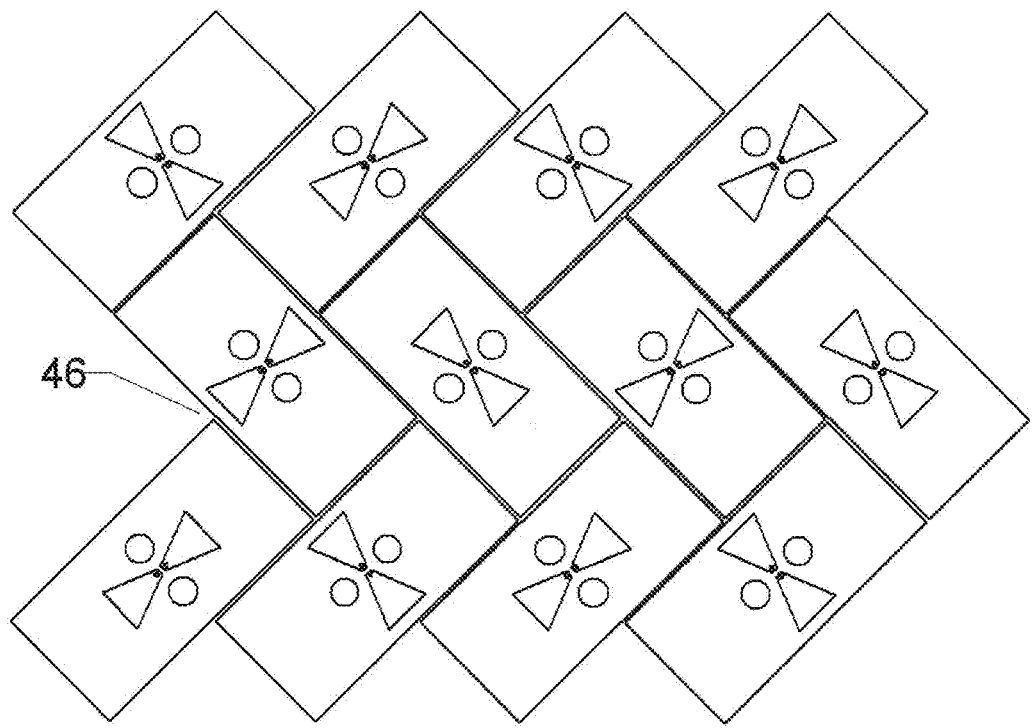

FIG. 37 shows the overall structure at this point. Twelve diced blocks are shown in FIG. 37, although there could be any number of diced blocks (including an array of thousands). Each block can be about 1 millimeter by about 2 millimeters, and the dicing slots 46 can be about 50 microns wide. The partial dicing from the top can be done in the event that the support wafer bonding material (such as special-purpose wax) is attacked by the quartz etchant. The dicing is done in two steps here (as shown in FIGS. 30 and 33). The dicing could also be done in a single step, such as during the step shown in FIG. 33. During the dicing of the blocks, the vacuum holes 5 can be left uncovered, and only the slowly etched lateral faces (x and y directions) of the crystalline quartz 9 may be exposed. The hole widths may not be critical, and any later widening of the holes 5 can be anticipated and corrected for when they are first made. The material of the support wafer 47 can be chosen to match a bolometer substrate, and the wax bond is not shown in the figures.

Figure 38:
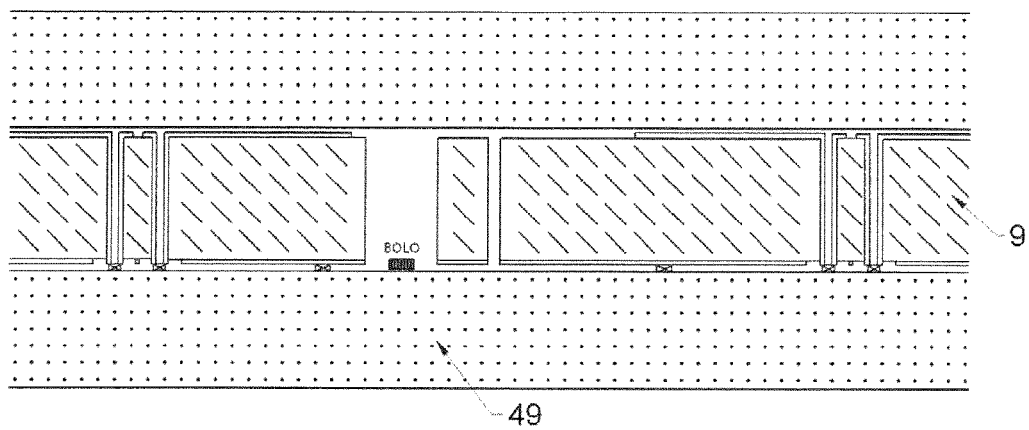
Figure 39:
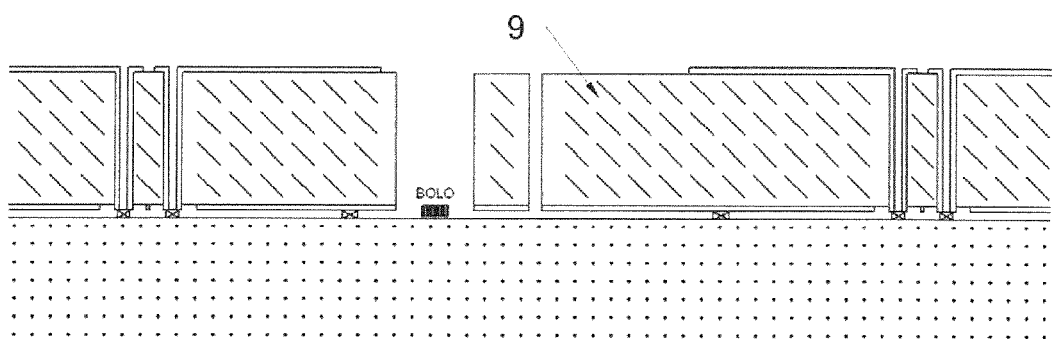

As shown in FIG. 38, the structure is bonded (such as using the solder bumps 48) to a completed bolometer substrate 49. Thermal expansion of crystalline quartz in the x and y directions is different from either silicon or quartz glass. The solder-bonding can be done at high temperature, and dicing the crystal quartz 9 into blocks allows them to expand independently and to move with the expansion of the support wafer 47 and bolometer substrate 49. At least two solder bumps 48 can be assigned to each block. Thermal expansion within a block can be very small. In some embodiments, there may be metal pedestals (elements 4a2-4b2), such as about 4 microns high, already placed on the bolometer substrate 49 to accommodate the solder bumps 48. The pedestals 4a2-4b2 go under the antenna posts and have traces that connect to the twin leads and the bolometers. Whatever the initial height of the solder bumps 48, the separation between the ground plane 2 and the bolometers 14*a* after bonding can have a desired distance, such as about 30 microns. As shown in FIG. 39, the upper support wafer 47 is removed, and the wax bonding is cleaned up.

The fabrication approach described above, using crystalline quartz and metal plating, provides a path for creating the array with residual materials that do not outgas. This can be important when the array is used in a vacuum. Moreover, this approach provides relatively wide passages for removing air from the array, which is why at least one vacuum hole 5 is placed in each antenna site. These holes 5 also provide access for freeing bolometer bridges and for ashing and clean up. In the bolometer fabrication, polyimide (or suitable substitute) can be left under the bolometer bridges, and removal of the polyimide constitutes releasing the bridges. The array of horn receivers (FIG. 5) or the staggered version (FIG. 18) sits over the antenna array.

As previously stated, the director/array can be fabricated in a single piece of material. Small feet (not shown) at the bottom of the horn receivers 1 can maintain a desired separation, such as about 12.5 microns, from the upper surface of the crystalline quartz 9. The director can be all metal, with submicron accuracy for the horn interiors. This can be made, for example, by any vendor who specializes in precision machining (such as OWENS INDUSTRIES INC., Oak Creek, Wis.).

Figure 40:
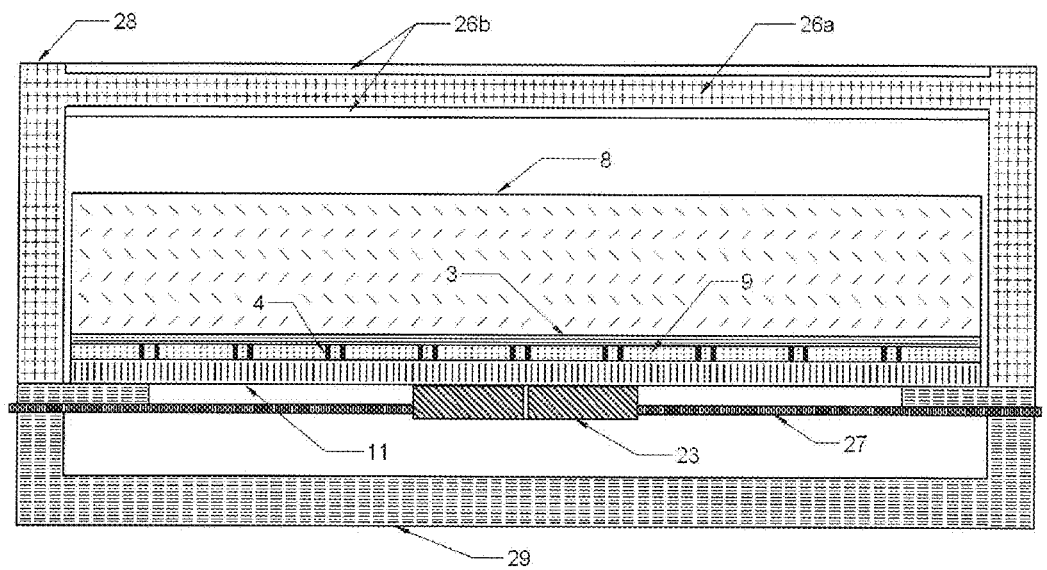
FIG. 40 shows a side view of a vacuum enclosure into which a complete terahertz focal plane array can be mounted with a window at the top.

FIG. 40 shows a side view of a vacuum enclosure 28 into which a complete terahertz focal plane array can be mounted with a window at the top. The vertical dimensions are greatly exaggerated to show details. The overall thickness may have any suitable value, such as about 10 millimeters. The upper part of the enclosure 28 can be made of quartz glass. A window 26*a* in the enclosure 28 can be fabricated separately and bonded or otherwise attached to the enclosure 28. Layers 26*b* represent two antireflection coatings. The bottom part 29 of the enclosure 28 can be made of metal with shelves supporting the bolometer substrate 11, which in turn supports the z-cut crystalline quartz 9. The bow tie antennas 3 and the antenna posts 4 are also depicted. The ROICs 23 are shown attached to the bottom of the bolometer substrate 11 with control, signal, and bias cables 27 extending outside the vacuum enclosure 28. The mechanism for evacuating the enclosure 28 is not shown, although any suitable mechanism could be used.

Figure 41:
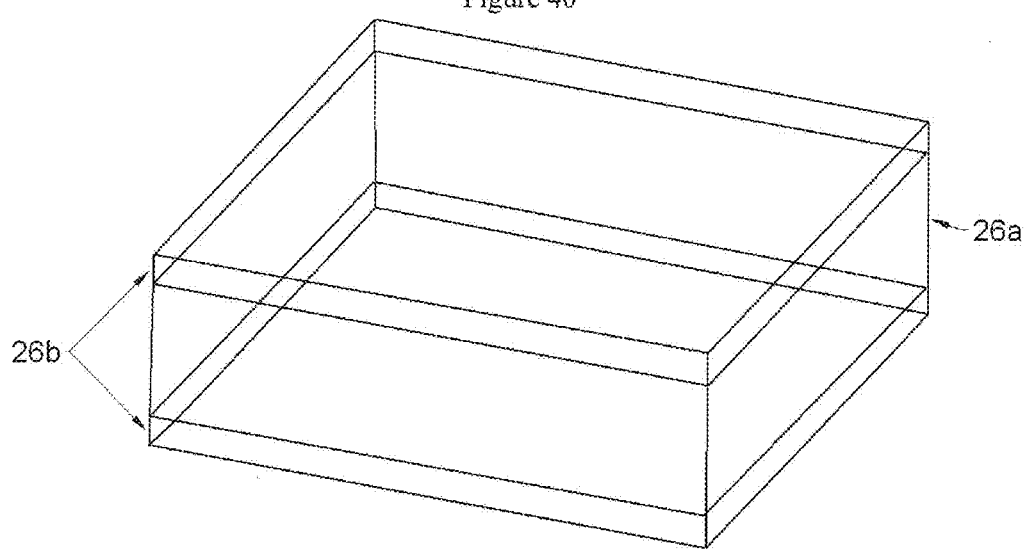
FIG. 41 shows the window separately.
Figure 42:
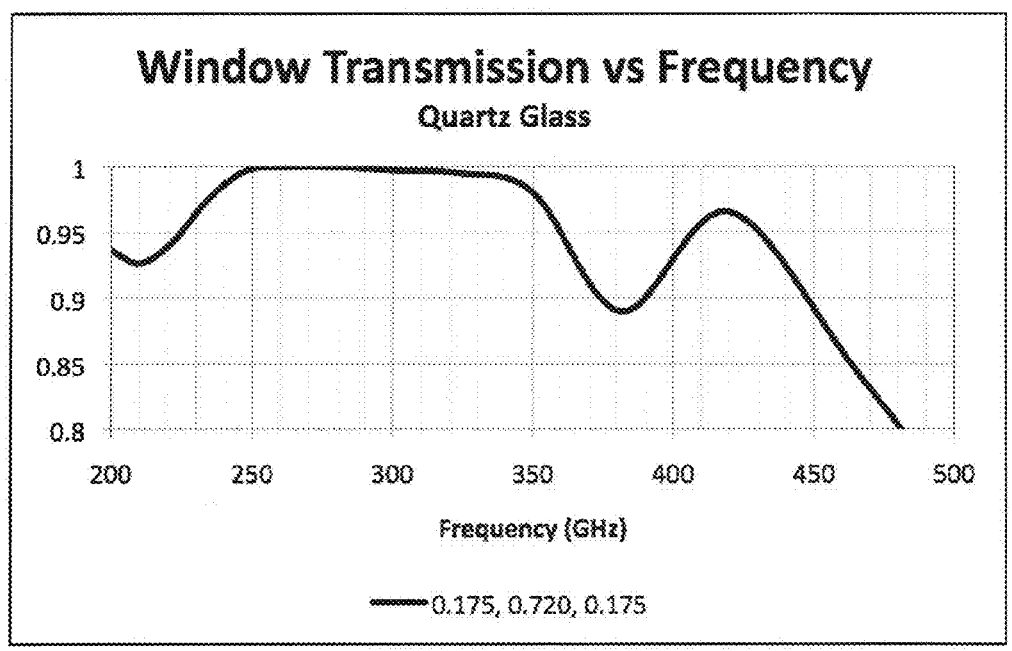
FIG. 42 shows a chart illustrating transmission of the window versus frequency.

The window 26*a* in FIG. 40 is shown in FIG. 41. The vertical dimension is greatly exaggerated. The window 26*a* could be formed from quartz glass that is about 0.72 millimeters thick with antireflection coatings 26*b* on top and bottom. The antireflection coatings could be about 0.175 millimeters thick. The index of refraction is about 1.944 for the quartz glass and about 1.394 for the antireflection coatings. FIG. 42 is a plot of the window transmission versus frequency. Note that the vertical scale starts at 80%. Transmission is substantially 100% from about 250 GHz to about 350 GHz, and transmission stays substantially above 90% out to about 450 GHz.

The interior or lower antireflection coating 26*b* in FIG. 40 can be made by etching a grid into the quartz surface with a pitch smaller than the shortest wavelength of interest. In some cases, the shortest wavelength could be about 0.7 millimeters (about 430 GHz). The depth of the grid can be about 0.175 millimeters, and the ratio of material removed to that remaining could produce an equivalent index of refraction of about 1.394. The original thickness of the quartz block can be chosen to accommodate this etching and leave a final body thickness of about 0.72 millimeters. The exterior or upper antireflection coating 26*b* in FIG. 40 could optionally be a material with the right thickness and index.

The position of the window 26*a* can affect the performance of the entire array. In FIG. 40, the separation between the top of the array 8 and the bottom of the window 26*a* could be about 0.655 millimeters. When placed at that position, a high-frequency finite-element CAD simulator can yield a somewhat better performance with the window 26*a* in place than without it. This may seem counterintuitive, but it can be explained by remembering that far field reception is influenced by "everything" in the near field. The structure may be represented by a complex equivalent circuit. For maximum reception, this circuit's impedance can match the radiation impedance of free space as closely as possible over as wide a frequency range as possible. The window 26*a* is part of that circuit and can be included in fine-tuning the structure. If necessary, at least one dielectric column may be inserted between the window 26*a* and the array 8 to maintain the correct spacing while the space in the gap is under vacuum.

Figure 43:
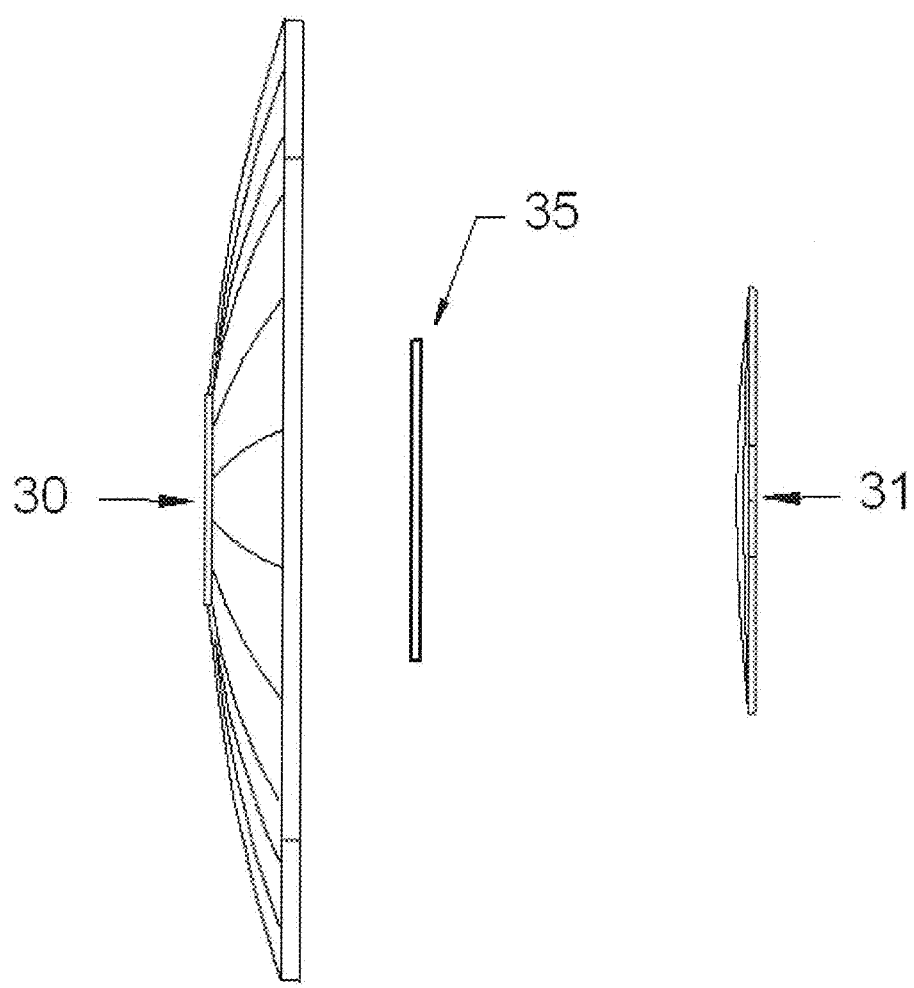
FIG. 43 shows a side view of principal elements of a modified Cassegrain imaging system with a primary mirror, a secondary mirror, and a focal plane detector array.

A number of different imaging systems can utilize the focal plane array described above. FIG. 43 shows a side view of principal elements of a modified Cassegrain imaging system, which is suitable for terahertz imaging. Radiation is incident from the right and is first reflected from a primary mirror 30 and converged onto a secondary mirror 31, which in turn focuses the radiation back onto a focal plane array 35. The radiation arriving at the focal plane array 35 represents an image of a scene/object. Table I gives example specifications for the elements of the system in FIG. 43.

TABLE I

| Description | PM diameter | PM hole diameter | SM diameter | SM pivot-drive | P-S separation | S-FP separation |
|---|---|---|---|---|---|---|
| Millimeters | 508.0 | 178.0 | 243.0 | 79.6 | 292.5 | 181.2 |
| Other millimeters | Radius/curve 872.9 | *aspheric, e = 0.8 | Radius/curve 1154.0 | | | ** adjustable-focus |

In Table I, PM (or P) represents the primary mirror, SM (or S) represents the secondary mirror, and FP represents the focal plane occupied by the detector array. In this example, the primary mirror 30 is aspheric with an eccentricity of 0.8, and the secondary mirror 31 is spherical. Note, however, that other optical components could be used to direct radiation onto the detector array.

Figure 44:
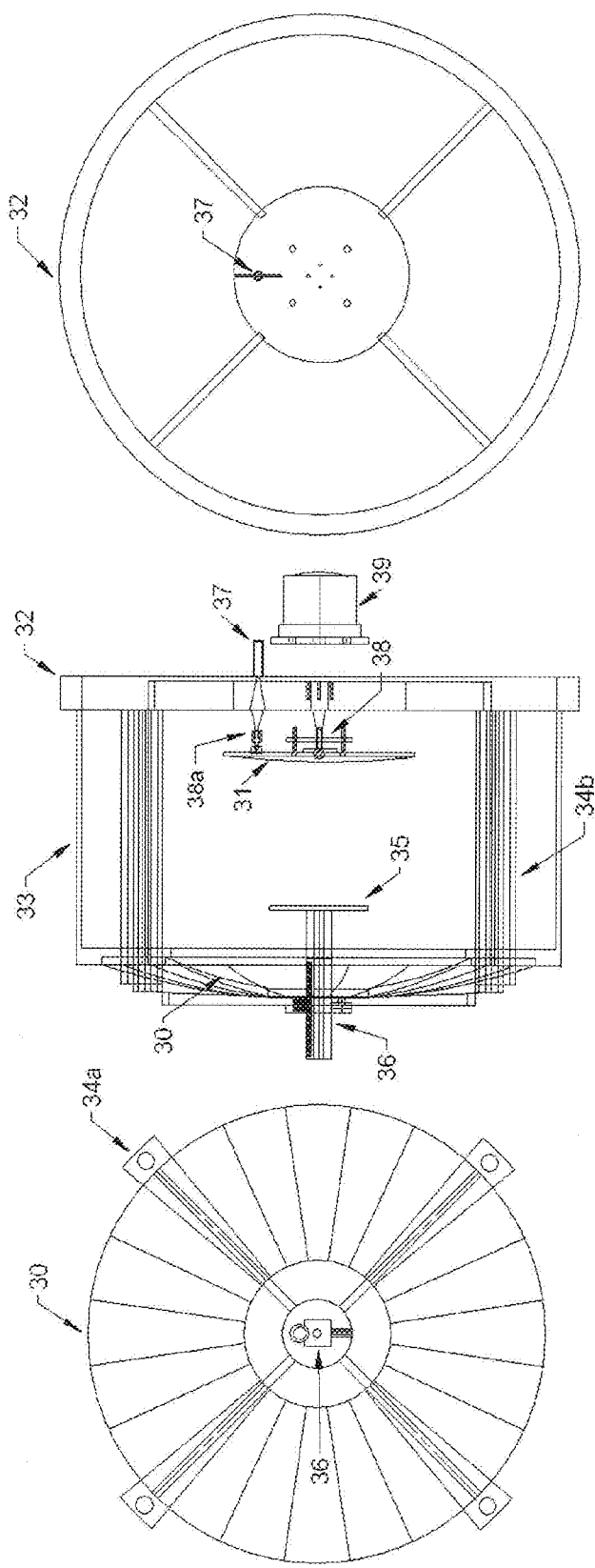
FIG. 44 shows a layout of the Cassegrain imaging system and cage with an embedded infrared camera.

FIG. 44 shows a layout of the Cassegrain imaging system and cage with an embedded infrared/visible camera. The system in FIG. 44 is a dual-mode imaging system in that it supports both terahertz and infrared/visible imaging. On the left in FIG. 44 is a front view of the primary mirror 30. Four struts 34*a* support the primary mirror 30, and a focusing mechanism 36 is included. In the center of FIG. 44 is a side view of the complete terahertz camera and cage. The four struts 34*a* on the primary mirror 30 are connected to four bars 34*b* that maintain a fixed standoff between the primary mirror 30 and a retaining ring 32. A cowling 33 encircles the cage.

This arrangement forms a rigid frame for the terahertz optics. Here, the primary mirror 30 can have an aperture of about 510 millimeters, and the secondary mirror 31 obscures the incident radiation by about 20% (although these values are examples only). The modulation transfer function and the point-spread function for this annular aperture are negligibly different from an open aperture.

In the center of the figure, the focal plane array 35 is shown as being supported by a bar along with the focusing mechanism 36. To focus, the mechanism moves the detector array 35 closer to or further away from the secondary mirror 31. In the center of the figure, to the right of the terahertz camera cage, is an infrared/visible camera 39, such as an uncooled IR camera. The center-lines of the terahertz and infrared/visible cameras can be bore-sighted, and their fields of regard can be mapped. The terahertz field of regard for the design shown can be about 10°, which could be expanded up to about 14° with modification. Since the throughput can be about 80%, the NEDT of the array can increase from a value of 1.74 K to an effective value of 2.18 K.

A front view of the retaining ring 32 is shown on the right of FIG. 44. It holds the secondary mirror 31 in place. A mechanism 38 fixes the xyz position of the secondary mirror 31 relative to the primary mirror and allows rotation around two orthogonal axes of rotation (through a center of the secondary mirror 31 and perpendicular to a center line of the optical system). Through a linkage 38a, a small back and forth tilt (dither) of the secondary mirror 31 can be produced by a miniature servo-controlled voice coil 37. This results in the image being dithered up and down past the detector array. Specifications for a suitable voice coil are shown in Table II.

TABLE II

| Electrical time constant | 70 microseconds |
|---|---|
| DC resistance | 3.5 Ohms |
| Coil inductance | 0.2500 mH |
| Force constant | 0.7200 Lbs/Amp |
| Peak force | 1.5 Lbs |
| Linear stroke | 0.1500 inches |

One example of a suitable voice coil is the NCMO2-05-005-4JB from MICROMO ELECTRONICS.

To accomplish the dither described in connection with FIG. 20, the total forward and backward thrust of the voice coil could be very small, such as about 0.62 millimeters. The mirror 31 can be lightweight (such as about 200 grams) and can therefore be moved rapidly. For example, if a continuous version of the sequence described for FIG. 20 is executed, there would be a turnaround twice in eight samples. The average power over a full cycle (based on the voice coil parameters in Table II) would be about 24 milliwatts. For 20-inch and 12-inch apertures, the average power can be greatly reduced. For the staggered case of FIG. 20, it could take about 0.133 seconds to record each image. For the two-step dither, it could take about 0.066 seconds to record an image. All power and control lines can be fed to the back of the imaging system, and the power used by the detector array could be less than about 3 milliwatts (not including the ROICs). The cage and mirrors can be made of carbon fiber reinforced plastic (CFRP), such as from COMPOSITE MIRROR APPLICATIONS, Tucson, Ariz. The mirror surface accuracy could be within about 2 microns to about 5 microns. The estimated weight for a camera cage and mirrors with a 20-inch aperture could be about 12 pounds. The structure can be made collapsible for transport and storage.

Figure 45:
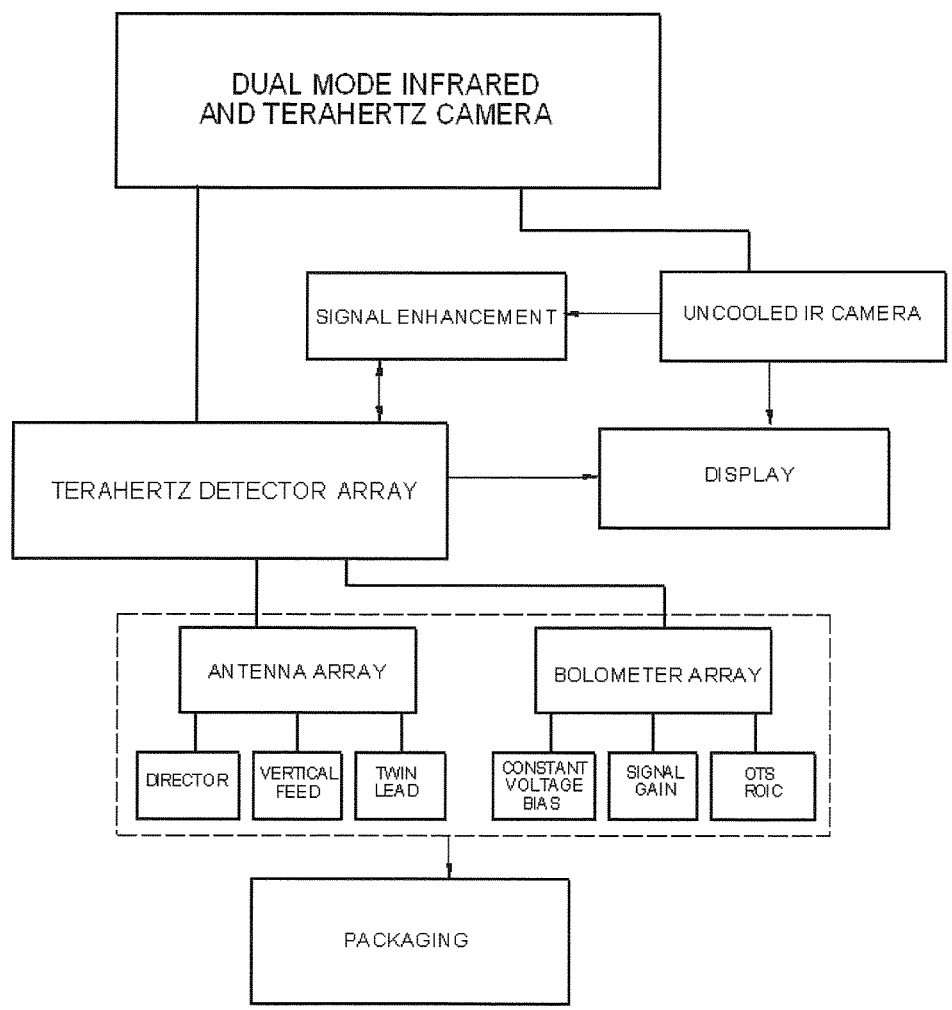
FIG. 45 shows a block diagram of a dual-mode terahertz imaging system.

FIG. 45 shows a block diagram of a dual-mode terahertz imaging system. The imaging system includes a terahertz detector array and an infrared/visible camera, such as an uncooled infrared camera. The terahertz detector array is formed using an antenna array and a bolometer array. The antenna array includes the director (array 8) described above. The display presents images captured by the terahertz detector. The signal enhancement block refers to a device (such as a signal processor) that performs image processing, such as by using the output of the infrared/visible camera to control the terahertz detector and to drive the display. The antenna array block, bolometer array block, and packaging block have been discussed above. The components of the terahertz detector array can be placed within a suitable packaging, such as the vacuum enclosure 28.

There are also methods that can be used to support frame-to-frame tracking of pixels associated with objects of interest in a scene. The application of this is referred to as "optic flow" or "image flow." Referring back to FIGS. 44 and 45, these systems are dual-mode systems since each contains terahertz and infrared/visible imagers. Both imagers can share the same frame rate and bore sight, and their fields of regard can be mapped. Using an NEDT of 2.18 K per frame, the terahertz imager can have adequate sensitivity for many scenarios. However, in those cases where an object either has a very low signal contrast, is moving rapidly, or both, the terahertz imager may not be able to follow. One purpose of the infrared/visible camera (with its high sensitivity) can be to perform continuous high precision pixel tracking. A live record of the results is provided to the terahertz imager, its appropriate detector sites are identified, and their outputs are accumulated in a buffer. This is done repeatedly over multiple frames. Multi-frame accumulation can take place, and the signal-to-noise ratio grows as if the object was stationary. Since the instantaneous position and orientation of objects in the scene are tracked in real time by the infrared/visible camera, terahertz video may be constructed after a small initial lag.

Figure 46:
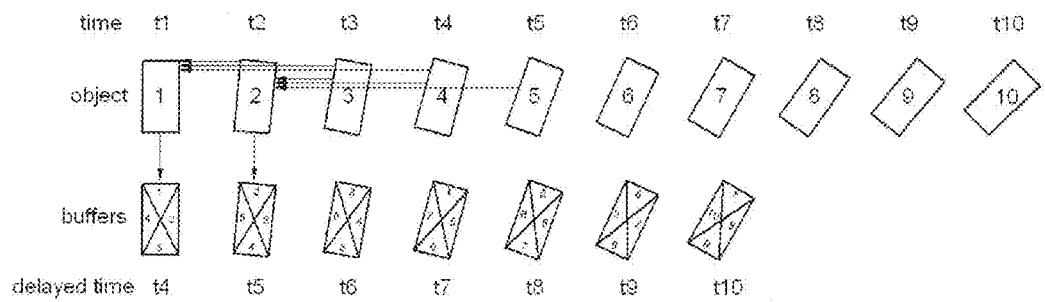
FIG. 46 shows an illustration of a pixel tracking-based enhancement of a terahertz signal.

In the following example, assume there is no dithering for simplicity. FIG. 46 depicts an open rectangular object moving left to right and rotating in time. Its positions are labeled 1, 2, 3, and so on. Above the rectangles are the sample times denoted t1, t2, t3, and so on for successive images taken by the infrared/visible and terahertz cameras. At time t1, the pixels in the infrared/visible recorded image of the rectangle at position 1 are mapped into larger terahertz pixels that form the terahertz image of the rectangle at position 1. The identification of the corresponding terahertz detectors is made, and the output image of these detectors is placed in a first storage buffer shown in the figure below the rectangle at position 1.

At time t2, the pixels in the infrared/visible recorded image of the rectangle at position 2 are mapped into larger terahertz pixels that form the terahertz image of the rectangle at position 2, and the new terahertz detectors are identified. The output image from these detectors is first copied to the second storage buffer shown in the figure below the rectangle at position 2, then rotated back to the orientation the object had at time t1 and added to the first storage buffer. At time t3, the pixels in the infrared/visible recorded image of the rectangle at position 3 are mapped into larger terahertz pixels that form the terahertz image of the rectangle at position 3, and the new terahertz detectors are again identified. The output from these detectors is first copied to the third storage buffer shown in the figure below the rectangle at position 3, then rotated back to the orientation the object had at time t2 and copied to the second storage buffer. The output is further rotated back to the orientation the object had at time t1 and added to the first storage buffer.

At times t4 and t5, the sequence is repeated for the pixels in the infrared/visible recorded images 4 and 5, except three back rotations are performed. The image at position 4 is the last contributor to the first storage buffer, and the image at position 5 is the last contributor to the second storage buffer. The arrows show the progression. At time t4, the terahertz image in the first storage buffer is made up of four accumulated images as depicted in the figure. It has a signal-to-noise ratio twice as large as it had at time t1 (signal-to-noise improves as the square root of the number of images in the buffer). At time t5, the terahertz image in the second storage buffer is made up of four accumulated images as depicted. It has a signal-to-noise ratio twice as large as it had at time t2.

This process is repeated at times t6, t7, and so on as the infrared/visible camera performs additional image sampling and hand off to the terahertz camera. When the data in a given storage buffer is no longer needed, it can be cleared and used again. As time goes on, the revolving storage buffers provide time-dependent image data for the terahertz display, complete with the proper pixel positions. The rectangular object, as portrayed on the terahertz screen, travels across the display with its true speed and rotation, exhibiting twice its single-sample signal-to-noise ratio, but with a real-time delay of four sample times.

The pixel tracking and signal enhancement sequences described above can be extended to a whole scene being viewed. In that case, instead of undoing a rotation, vector displacements of pixels from one frame to the next can be measured and reversed. The number of terahertz images accumulated in the buffers can be chosen in any suitable manner (such as by an operator) and can range from a value of 1 to N (such as based on the scene conditions). This value can be changed, such as by an operator, during operation of the system. As mentioned above, the open rectangular object in FIG. 46 is seen by both the infrared/visible and terahertz cameras. If the object has something inside it, such as under a cover that the infrared/visible camera cannot penetrate, the terahertz camera can reveal and image it with an enhanced signal-to-noise ratio based on the chosen delay.

Figure 47:
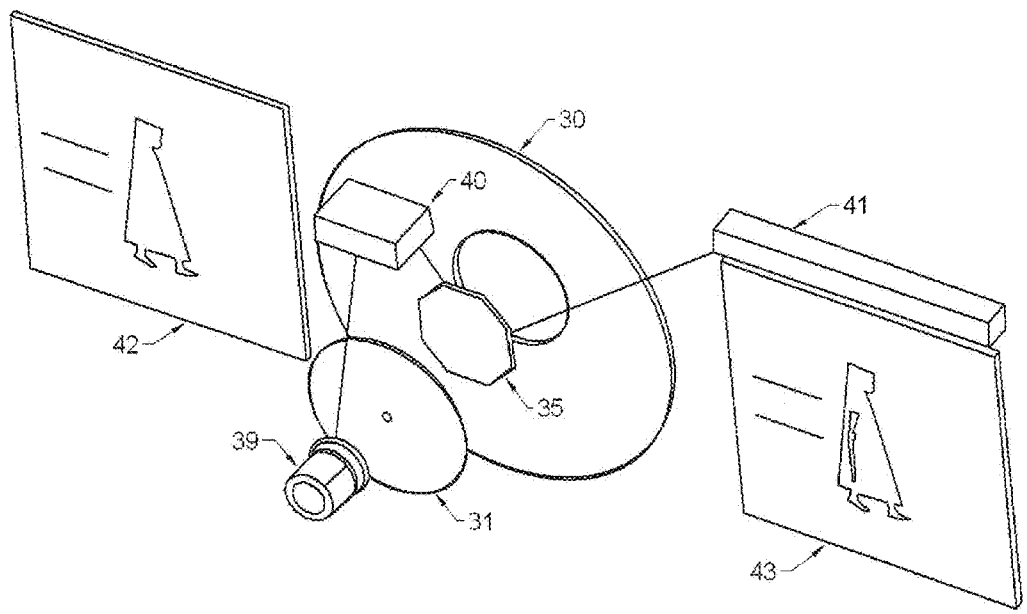
FIG. 47 shows parts of a terahertz signal enhancement operation.

FIG. 47 shows parts of a terahertz signal enhancement operation. In this example, the terahertz camera is again stripped down to the primary mirror 30, the secondary mirror 31, and the focal plane array 35. There are two displays shown for illustration purposes, though a single display could be used. A display 42 is the infrared/visible display, and a display 43 is the terahertz display. The infrared/visible camera 39 is in front. Two additional components are shown in FIG. 47. A block 40 performs a master/slave function between the infrared/visible camera and the terahertz detector array. Using tracked pixels from the infrared/visible camera, the block 40 instructs the terahertz array which of its detectors to use for imaging. Another block 41 represents a buffer and driver for the terahertz display.

The thin lines in FIG. 47 connecting components indicate the flow of information. The infrared/visible display 42, which is fed by the infrared/visible camera 39, shows a person in heavy garb walking past the camera. The terahertz display 43, fed by the block 41, shows the same person and a concealed weapon being carried. Object space can be used to compare the pixel sizes of the infrared/visible and terahertz imagers. Assume that an uncooled LWIR camera has a focal length of about 100 millimeters and a pitch of about 25 microns. This translates to an angular resolution of about $2.5 \times 10^{-4}$ radians. For the staggered array, the effective terahertz pitch (after dithering) can be about 0.707 millimeters, and the focal length can be about 408 millimeters ($510 \times 0.8$). This translates to an angular resolution of about $1.75 \times 10^{-3}$ radians. The ratio of resolution footprints in object space is therefore about 7:1.

Note that there are often uncertainties in the pixel tracking. It is therefore often advantageous to have the pixel tracking done by the infrared/visible camera with its higher initial precision. With the horizontal and vertical dithering mentioned previously, it may take a longer period of time (such as four 1/30th second exposures) to fully record a terahertz image. At the end of the first 0.133 seconds, four superposed recordings (each with lower resolution) can be obtained, and together they can constitute a full-resolution image.

To calculate the NEDT over extended times, assume an update every 0.133 seconds (a picture frame rate of 7.5 Hz) and accumulate using the single sample system NEDT of 2.18 K as the base. The NEDT lowers as the inverse square root of time. For example, if accumulation is performed for 0.632 seconds, the NEDT can equal 1 K. When accumulation is performed for a little over 2.5 seconds, the NEDT can equal 0.5 K.

For each case, potential 1/f noise and bias drifts can be reduced or minimized because successively different detectors are used for accumulating the signal from each pixel. Optic flow and pixel handoff can allow dwell time accumulation as long as the object(s) of interest stay within the field of regard or until the object(s) become too distorted through change of direction or adverse rotation. At that point, the system can be reset and the count continued with the new perspective. It may not be unreasonable to expect an NEDT down to about 0.5 K or below in many or most cases.

The terahertz imager sees through cover that normally hides concealed weapons, explosives, or other objects. If the cover and the object(s) being concealed are stationary and the cover is transparent at these wavelengths, a high signal-to-noise image of the concealed object(s) may be acquired with the terahertz camera alone by dwelling longer. If a concealed object (such as a suicide vest, weapon, or explosive) is fixed with respect to a moving carrier (such as a vehicle, human, or animal) and the carrier is not concealed, a high signal-to-noise terahertz image may be acquired using dual mode and hand-off. If a concealed object is moving behind a fixed cover, the infrared/visible camera may be unable to assist, and the terahertz camera acquires images unaided. As an added capability, two or more terahertz cameras as described above may be set up in a binocular or other arrangement to view people and objects at close range (such as out to 10 feet or more) in high-resolution 3D.

As noted above, various communication devices can employ passive terahertz cameras (with or without embedded infrared cameras) as imagers to establish and maintain highly-covert communication links. In some embodiments, the initial linking frequency of the communication devices may range from a low of about 90 GHz up to about 300 GHz, and advantage is taken of the very low noise threshold for the antenna-coupled micro-bolometer receivers in the terahertz cameras. At least one wide band communication channel can be incorporated that is freely chosen to fit the application, and there may be no technical requirements beyond those found in conventional communication systems. The communication systems described below can represent hybrid systems that use both RF components and optics.

Figure 48:
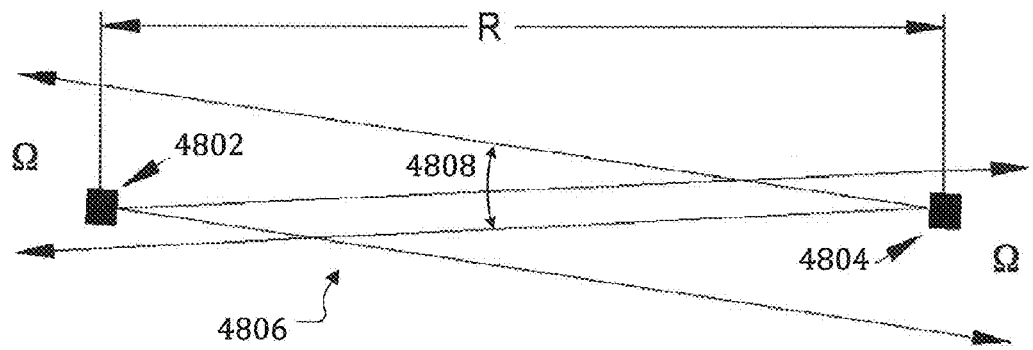
FIG. 48 shows two stations communicating via a communication link.

FIG. 48 shows two stations 4802-4804 communicating via a communication link 4806. Assume that the stations 4802-4804 are identical and separated by a distance R. Also assume that the stations 4802-4804 are unaware of each other's location except for a general direction. Each station 4802-4804 has an optical field-of-regard defined by an angle 4808, and the optical fields-of-regard overlap. Each station 4802-4804 performs link transmit and receive operations through the angles 4808.

The stations 4802-4804 shown here denote any suitable fixed or portable communication devices that engage in communications. Communications between the stations 4802-4804 could be unidirectional or bidirectional. Note that while only two stations 4802-4804 are shown here, any suitable number of stations could communicate. For instance, a series of stations could be used to support communications between devices separated by one or more intermediate devices.

Figure 49:
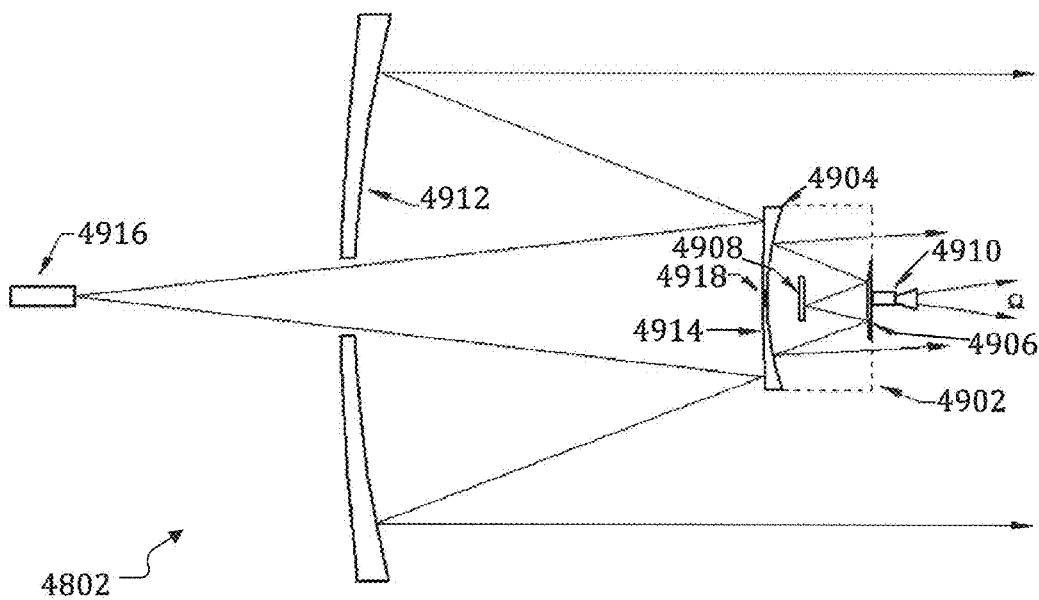
FIGS. 49 and 50 show a station supporting communications using terahertz cameras.
Figure 50:
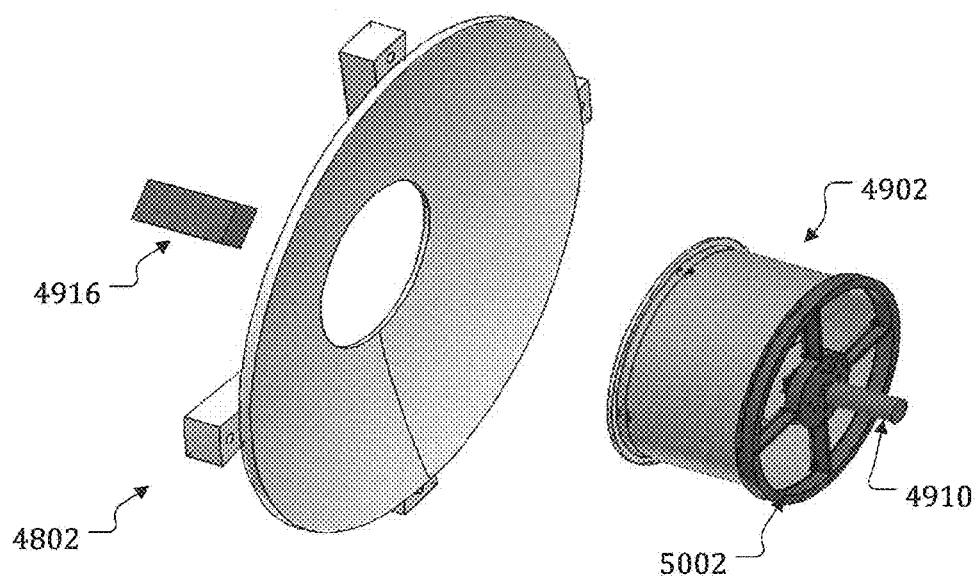

FIGS. 49 and 50 show a station 4802 supporting communications using terahertz cameras. FIG. 49 shows the elements of an optional configuration for accomplishing linking and communication in the station 4802. Linking refers to the stations 4802-4804 identifying one another and each station determining the angle to the other station. As described below, this can be accomplished using terahertz cameras. Communication refers to the stations 4802-4804 exchanging information, which could occur using infrared, RF, or other communication technologies.

There are two optical systems shown in FIG. 49. One optical system is a link receiver 4902 that includes a modified Cassegrain imaging system with a primary mirror 4904, a secondary mirror 4906, and an antenna-coupled micro-bolometer detector array 4908 at the focus position between the two mirrors 4904-4906. This link receiver 4902 is a terahertz camera with a field of regard of Ω steradians.

To the right of the secondary mirror 4906 in FIG. 49 is a link transmitter (LT) 4910, which can operate at the same or similar frequency as the link receiver 4902. The link transmitter 4910 also has a field-of-regard of Ω steradians. The link transmitter 4910 may contain a Gunn diode or other source facilitating transmissions. The link transmitter 4910 can be bore-sighted with the optical axis of the link receiver 4902.

The link transmitter 4910 and the link receiver 4902 perform linking operations with a remote station, such as the station 4804. When receiving, link-frequency radiation from the remote station 4804 is incident from the right, and the position of the radiation's focal point on the detector array 4908 allows a determination of the remote station's relative angular coordinates. When transmitting, the link transmitter 4910 broadcasts through its solid angle 4808 to be received by the remote station 4804, allowing the remote station 4804 to identify the relative angular coordinates to the station 4802.

The second optical system is positioned on the left in FIG. 49 and represents a conventional Cassegrain optical system. The second optical system includes a primary mirror 4912 and a secondary mirror 4914. The secondary mirror 4914 here denotes the backside of the primary mirror 4904 that is resurfaced to serve this purpose. The Cassegrain optical system is used for wide band communications with the remote station 4804 having a similar wide band system. The primary mirror 4912 has an aperture, which can match the directionality of the link receiver 4902. A wide band communication transmitter/receiver (COM) unit 4916 is located at the focal point of this system behind the primary mirror 4912. The COM unit 4916 could represent an infrared, RF, or other suitable wireless communication unit. The COM unit 4916 and the mirrors 4912-4914 form the wide band communication system, which can be bore-signed with the linking communication system. An absorber 4918 at the center of the secondary mirror 4914 is used to reduce or eliminate reflected radiation directed back at the COM unit 4916 when transmitting. In some embodiments, both Cassegrain systems have annular apertures, and the link frequency (used for linking) should be chosen to be at least twice the communication frequency (used for communication) in order to limit obscuration of the Cassegrain system's aperture.

In one aspect of operation, each station 4802-4804 can transmit a signal using its link transmitter 4910 to the other station, and each station 4802-4804 can receive the other station's signal using its link receiver 4902. This allows each station 4802-4804 to identify angular coordinates where to direct wide band communications to the other station via the second optical system. At each station, the detector or detectors in the detector array 4908 that receive a signal from a remote station can be identified, and the angular origin of the incoming signal relative to a central axis of the optical system can be determined.

FIG. 50 shows a 3D perspective view of the station 4802 implemented as shown in FIG. 49. The link receiver 4902 is at the right front with a cowling 5002. Radiation is incident from the right front. The link transmitter 4910 is integrated with the link receiver 4902, and the COM unit 4916 is also shown here. Note that the form factors of the various components are examples only.

Table III provides example parameters for specific implementations of the link receiver 4902 and link transmitter 4910 (referred to as a link system) and of the second optical system (referred to as a com system). Note that these parameters are examples only.

TABLE III

| | Aperture | Weight | F/# | Focal length | # of Detectors | Resolution Angle | Frequency |
|---|---|---|---|---|---|---|---|
| Link system | 6 inches | 1-1.5 lbs. | 1 | 6 inches | 350 | 9 milliradians | 275 GHz |
| Com system | 20 inches | 7-10 lbs. | 1.6 | 32 inches | N/A | 9 milliradians | 80 GHz |

The weight values here assume that mirrors and cages for the two systems are made of carbon fiber reinforced plastic (CFRP), which is a very strong, rigid, and light-weight material with low thermal expansion. One source of CFRP is COMPOSITE MIRROR APPLICATIONS of Tucson, Ariz. The detector array 4908 here contains 350 antenna-coupled micro-bolometer detectors, which represents the number of discrete positions that can be resolved in two dimensions at the array's surface for this particular choice of camera parameters.

Figure 51:
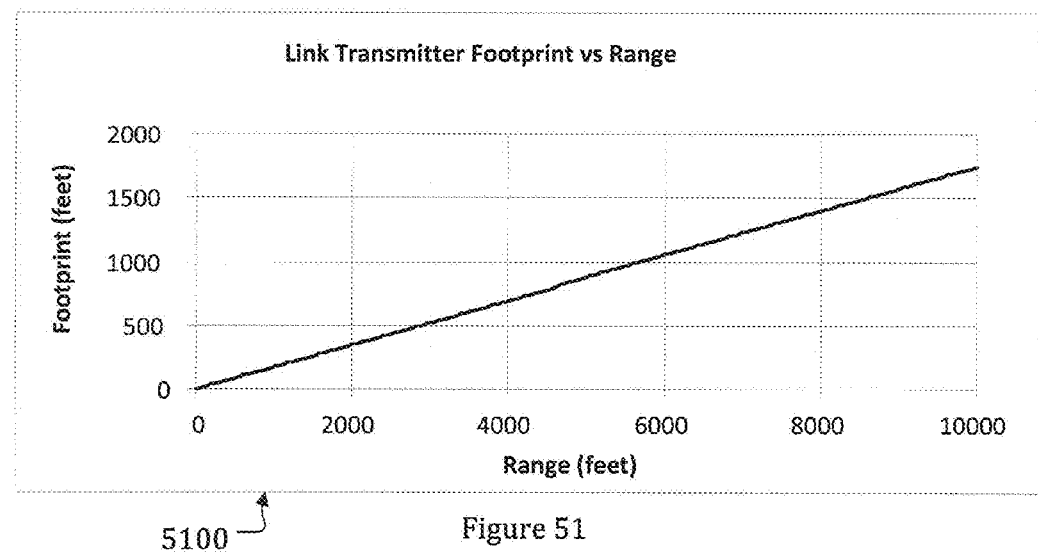
FIGS. 51 through 54 show details of communications involving the station of FIGS. 49 and 50.

FIGS. 51 through 54 show details of communications involving the station 4802 of FIGS. 49 and 50. These details are for illustration only and are based on simulation results for a specific implementation of the station 4802. Other implementations of the station 4802 could also be used. FIG. 51 is a chart 5100 showing a broadcast link footprint versus range for a 10° field of regard (Ω=0.024 steradians). This "search" footprint is about 1,750 feet across at a range of 10,000 feet (just under 2 miles).

Figure 52:
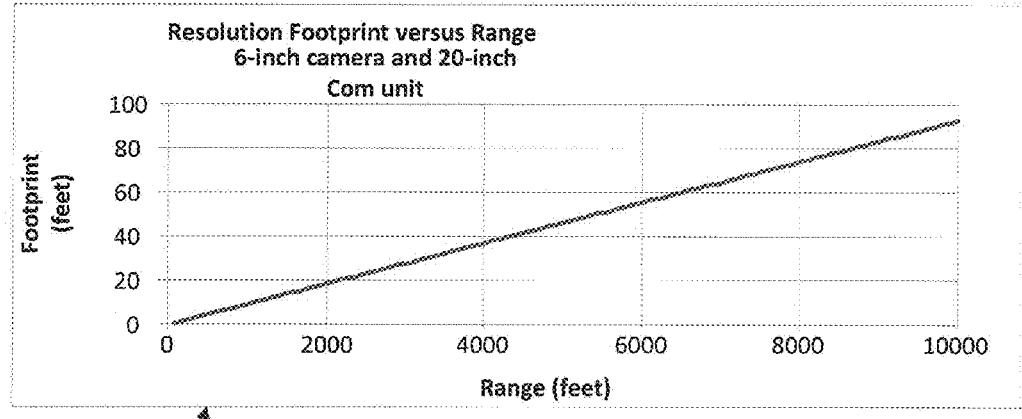

FIG. 52 is a chart 5200 showing a resolution footprint versus range after a link has been established (for both optical systems). The positional accuracy is about 90 feet across at a range of 10,000 feet. Referring back to FIG. 48, a simple expression for the power P received at the station 4804 with the station 4802 transmitting at power $P_0$ is:

$$P = \frac{P_0 A e^{-\alpha R}}{\Omega R^2}$$

where A is the receiving aperture at the station 4804 and α is the attenuation of the atmosphere. If the noise-equivalent-power of the receivers in the detector array 4908 at the station 4804 is NEP, the requirement for $P_0$ to meet that threshold is:

$$P_0 \geq \frac{NEP \Omega R^2}{A e^{-\alpha R}}.$$

As a particular example of an implementation, each station 4802-4804 sends out low-level link pulses at a nominal interval, such as an interval of about 30 milliseconds. These pulses can be broadcast through the solid angle Ω at a carrier frequency, such as about 275 GHz. The procedure can begin transmissions at some initial low power level and increase the power in steps to some maximum level. This would correspond to a sweep through a range looking for the noise threshold of the target receiver. An outside interceptor would need time to locate the transmitters, given its own remote location and provided it can even detect the pulses at this frequency. Once the target receiver threshold has been reached, the receiving station can send confirming pulses, and the determination of mutual angular coordinates could take place quickly. The two stations 4802-4804 could then be pointed to bring their angular offsets to substantially zero and remain locked in that orientation by continuing mutual link pulses.

Wide band two-way communications could occur between the stations 4802-4804, such as at a carrier frequency of 80 GHz. The two-way communications could operate over a very narrow solid angle, which would reduce or eliminate interception for anyone not in the direct line between the stations 4802-4804 as can be seen in FIG. 52. In the following example, assume a link receiver noise threshold (NEP) of $1.5 \times 10^{-12}$ watts at 30 Hz and an atmospheric attenuation of 9 dB/Km. This attenuation value corresponds to the nominal high attenuation in water vapor density at 275 GHz, which is the principal driver of attenuation when the sky is clear. Most of the time, atmospheric attenuation is much lower (not accounting for rain).

Figure 53:
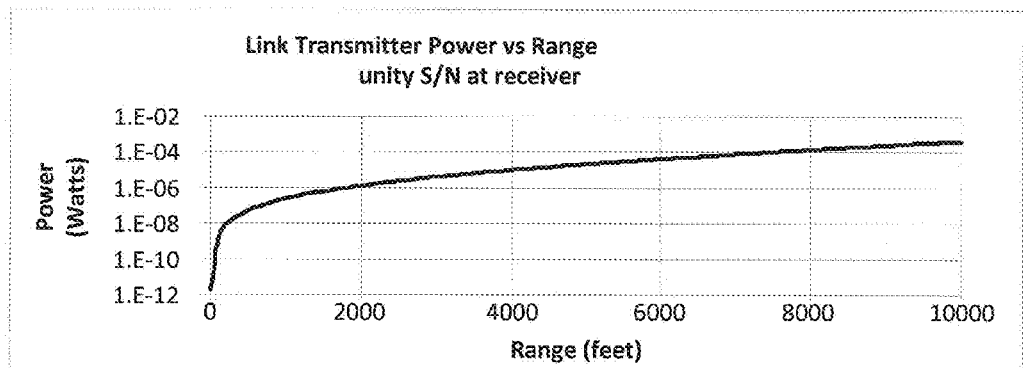
Figure 54:
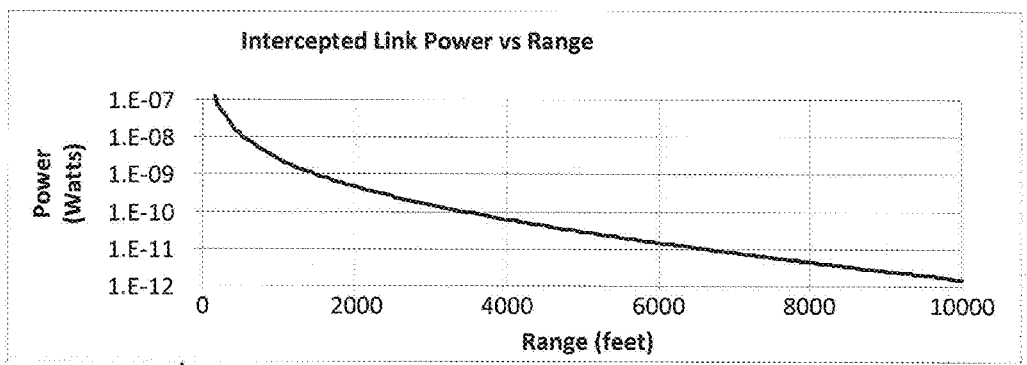

FIG. 53 is a chart 5300 showing transmitter power required to meet the noise threshold of a receiver as a function of range. If there is somebody trying to intercept a link, FIG. 54 shows the low power that the interceptor would have to detect versus interceptor range. Assume that an interceptor is in a broadcast zone of the transmitting receiver that is attempting to establish a link. In this case, the transmitter power is made equal to the receiver threshold at a range of 10,000 feet. The carrier frequency could be about 275 GHz and unknown to the interceptor. The chart 5400 illustrates the challenge for the interceptor even if close to the transmitting station. The link pulses could be about 20 to 30 milliseconds long. The pulses could include bursts of pulses and may be sent at random intervals. The transmitter and receiver solid angles need not be the same or even symmetric as assumed here. If the positions of the stations 4802-4804 are fixed, continuing link pulses to maintain lock could be at a very slow rate with reduced power levels or possibly not at all. If the positions of one or both stations 4802-4804 are dynamic, the rate of link pulses could be dictated by that dynamic. The link pulses might also be used for simple coded transmissions between the stations 4802-4804, which could be determined by the specific application. The best arrangement for all communications may be to rely on a very narrow solid angle through which the COM unit operates.

Figure 55:
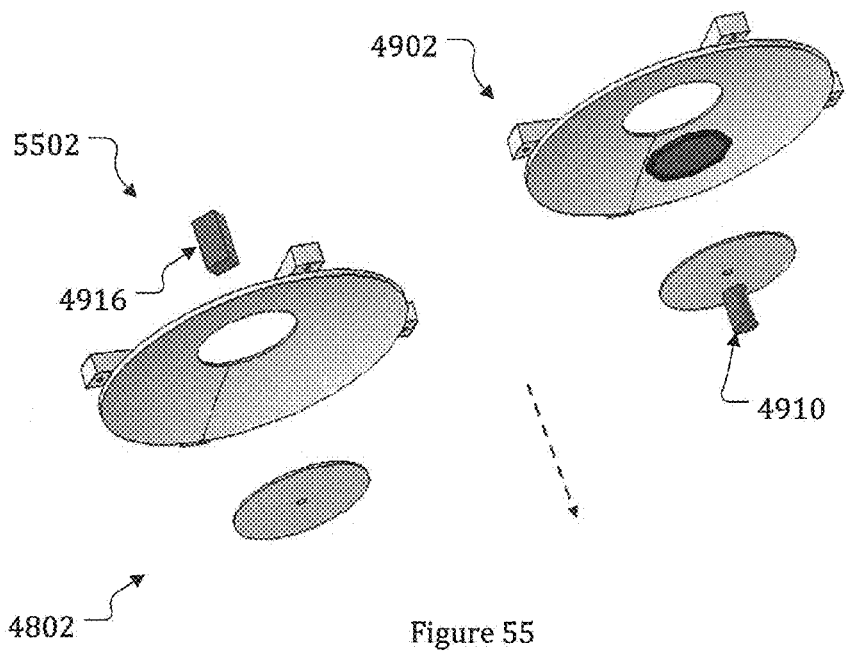
FIG. 55 shows another station supporting communications using terahertz imaging.

FIG. 55 shows another station 4802 supporting communications using terahertz imaging. In particular, FIG. 55 shows a 3D perspective view of this implementation of the station 4802. Here, a communication transmitter/receiver 5502 and a link receiver 4902/link transmitter 4910 are placed side-by-side on a common platform. The dashed arrow indicates the direction in which the components are looking, and this arrangement can allow the transmitters/receivers to operate at similar frequencies. Again, the link transmitter 4910 and the COM unit 4916 are shown, and the basic elements of the link receiver 4902 are those of a terahertz camera. Table IV provides example parameters for specific implementations of the link receiver 4902 and link transmitter 4910 (the link system) and of the communication transmitter/receiver 5502. These parameters are examples only.

TABLE IV

|  | Aperture | Weight | F/# | Focal length | # of Detectors | Resolution Angle | Frequency |
|---|---|---|---|---|---|---|---|
| Link system | 18 inches | 7-10 lbs. | 0.85 | 15 inches | 350 | 9 milliradians | 94 GHz |
| Com system | 20 inches | 10-15 lbs. | 1.6 | 32 inches | N/A | 9 milliradians | 80 GHz |

The weight values here assume that mirrors and cages are made of CFRP. A link frequency of about 94 GHz could be selected for lower atmospheric attenuation, but it could range up to about 130 GHz and still give a similarly low value. The number of discrete positions that can be resolved at the array surface for this camera again comes out to 350, which is the number of antenna-coupled micro-bolometer detectors in the focal plane.

Figure 56:
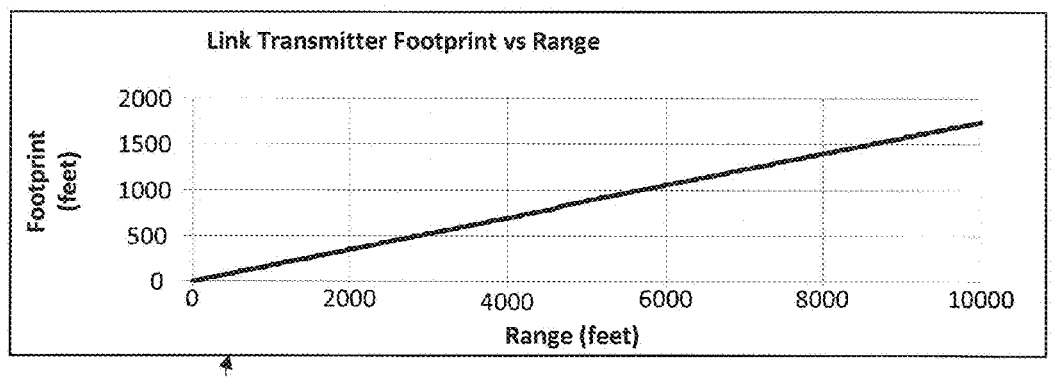
FIGS. 56 through 59 show details of communications involving the station of FIG. 55.
Figure 57:
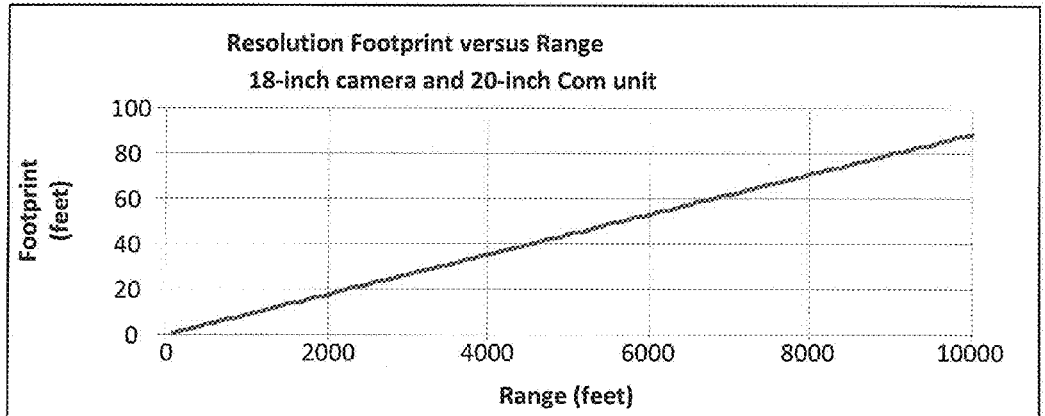
Figure 58:
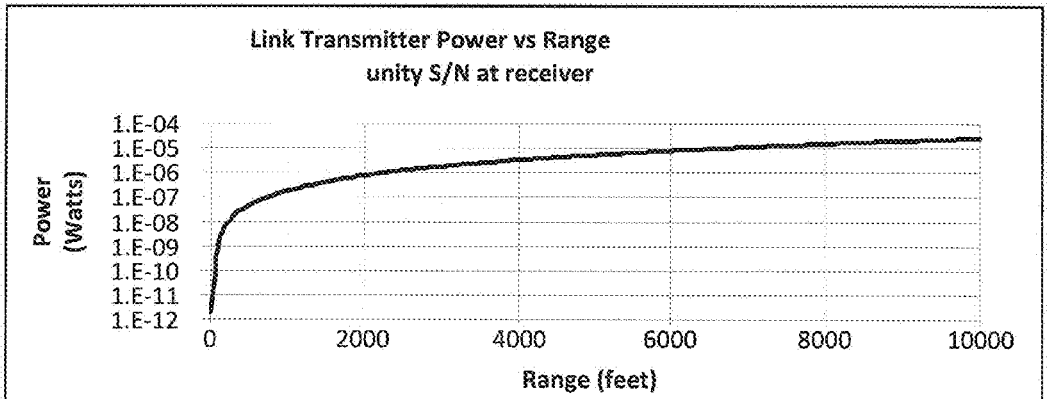
Figure 59:
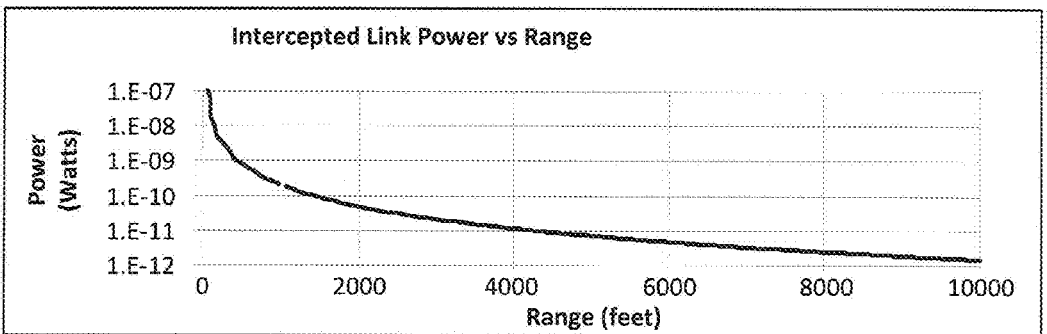

FIGS. 56 through 59 show details of communications involving the station 4802 of FIG. 55. FIG. 56 is a chart 5600 showing a broadcast link (search) footprint versus range for a 10° field of regard (Ω=0.024 steradians). This chart 5600 is substantially identical to the chart 5100 shown in FIG. 51. FIG. 57 is a chart 5700 showing a resolution footprint versus range for the link and communications units. The positional accuracy for both systems is about 90 feet at a range of 10,000 feet. FIG. 58 is a chart 5800 showing the link transmitter power versus range. Assume a link receiver noise threshold (NEP) of $1.5 \times 10^{-12}$ watts at 30 Hz but with a reduced atmospheric attenuation of 1 dB/Km. This attenuation value corresponds to the nominal high attenuation in water vapor density at 94 GHz. In the previous case shown in FIG. 53, the transmitter power required at 10,000 feet was several hundred microwatts, while here it is about 30 microwatts. FIG. 59 is a chart 5900 that shows the interceptor link power versus range. In FIG. 54 the potential signal to be intercepted is $1 \times 10^{-10}$ watts at 3,500 feet from the transmitter, while in FIG. 59 it is an order of magnitude smaller ($1 \times 10^{-11}$ watts) at 4,000 feet from the transmitter.

Figure 60:
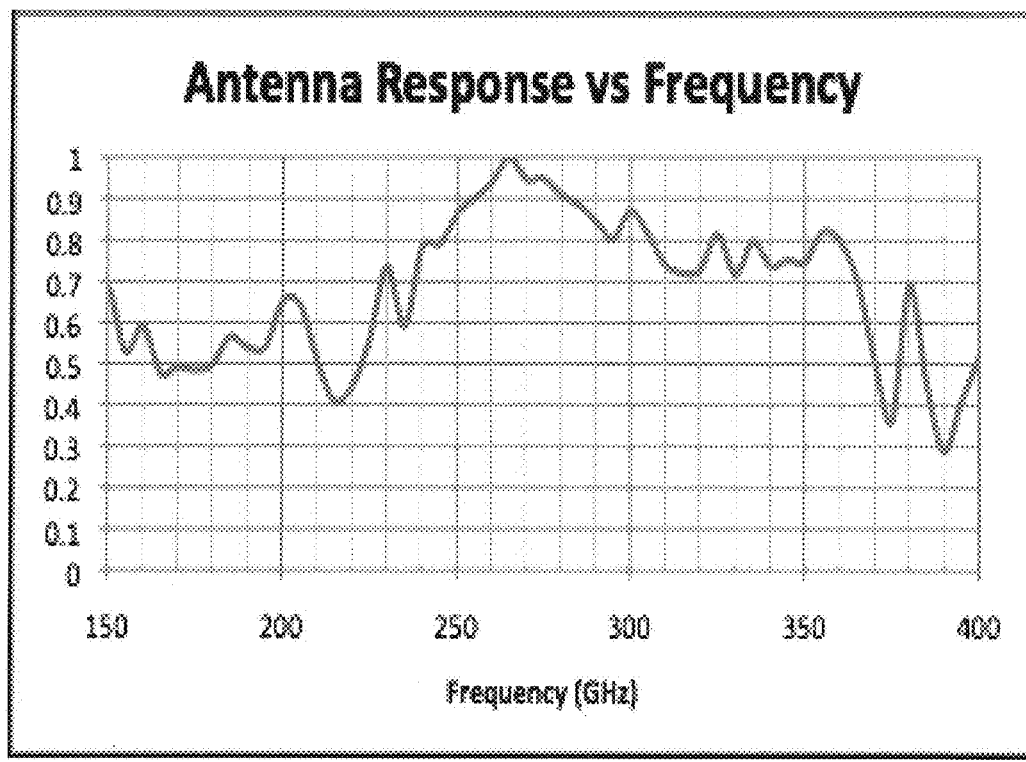
FIGS. 60 through 63 show a band pass filter that can be used in a station and related details.

FIGS. 60 through 63 show a band pass filter that can be used in a station 4802-4804 and related details. The terahertz camera (link receiver) can accept radiation over a wide terahertz band. FIG. 60 is a plot 6000 of antenna response versus frequency for an example terahertz camera. Natural radiation from the Earth over this band typically constitutes an input that is several hundred times the noise threshold (NEP) being used here. The radiation is made up of two parts. The major part is fixed background radiation from the Earth's surface emitting at a nominal blackbody (gray body) temperature of 295 Kelvin, which can be removed electronically (as described above). The smaller part is from time and space variations due to different features of the surface and various objects on it. Most variations involve lower emissions and negative apparent temperatures, but rare positive variations can come from absorbent things warmed by the sun, running engines, heating systems, fire, etc. If these things are ignored while searching (and they can be distinguished by having no time signature and appearing at discrete locations on the detector array), a background level can be obtained that is as low as or lower than the noise threshold (NEP), provided the acceptance band is restricted.

Figure 61:
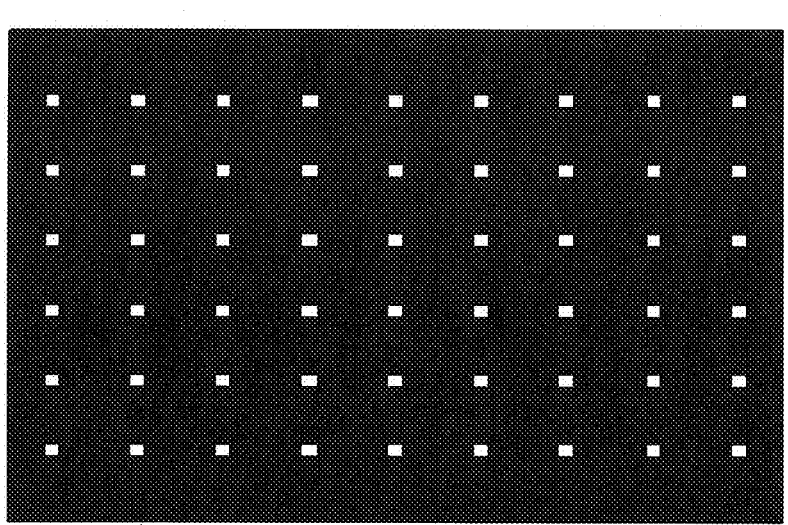
Figure 62:
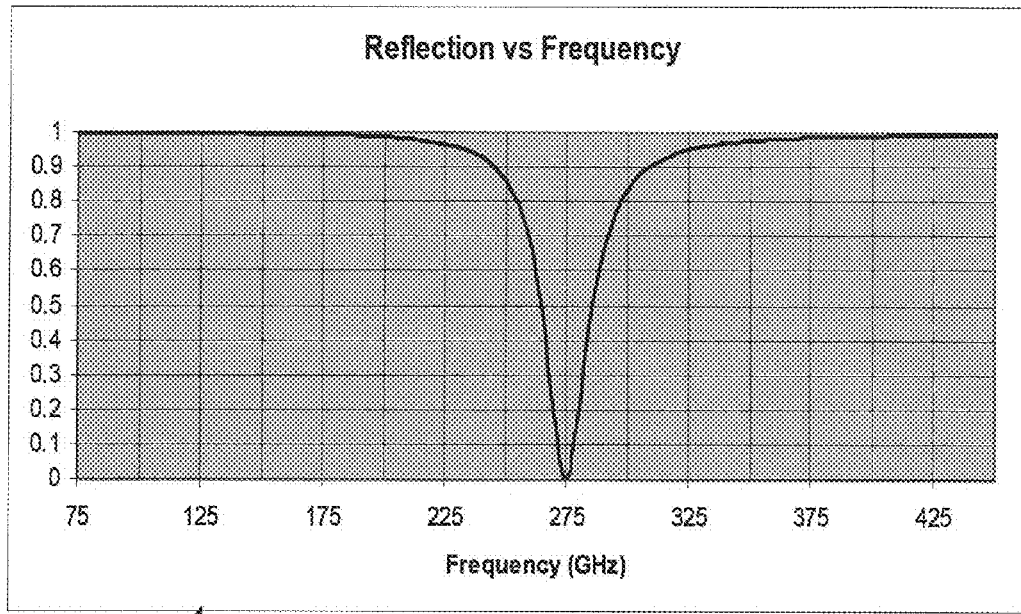

FIG. 61 represents a band pass filter 6100 that can be used by the stations 4802-4804. The band pass filter 6100 is implemented as a "holey plate" here. If the hole dimensions are chosen to be 0.1 mm by 0.1 mm and the hole spacing is 1.0909 mm, the resultant reflection versus frequency for this plate can be as shown in FIG. 62. As the chart 6200 in FIG. 62 shows, this looks to be a very narrow filter. However, closing in on the frequency range around the zero point is shown in FIG. 63. There are two curves in FIG. 63, one for normal incidence and one for 5° off-normal (which is the maximum for a 10° field of regard). For the off-normal incidence, the curve shifts to a higher frequency, in this case by about 0.8 GHz. For each incident angle, the curve can shift accordingly. With this filter 6100, the effective acceptance bandwidth is about 6.5 GHz. If a positive temperature variation overlaps the position of the transmitting station but does not exceed 20 Kelvin, its background power level would not exceed 60% of the threshold noise floor (NEP). The filter 6100 may be fabricated in any suitable manner, such as by depositing and patterning a thin metal film on a substrate, which could be a thin film of dielectric material. It can be placed over the forward aperture of a terahertz camera/link receiver as a dust cover or other structure.

In summary, different designs for communication stations (including a compact design and a side-by-side design) are provided that support a wide range of link and communication frequencies. The two configurations are illustrated here to show flexible choices in linking frequency and may be used in many different scenarios. These systems may be scaled up or down for different resolutions and ranges, and they may be mounted on fixed or moving platforms. Multiple links may be strung together for relaying information. Also, the "search" solid angle Ω may be adjusted to be wider or narrower. As previously stated, atmospheric attenuations chosen in the illustrations were nominally the highest that would typically be found throughout the world (absent rain and storms), and atmospheric attenuation is much less most of the time and in most places. This method of linking and communicating can be highly covert. When establishing a link, the needed transmission power levels can be extremely low, and the flexible linking frequency can be higher than is normally accessible and unknown by potential interceptors. Once established, the link may be maintained with high angular resolution. When communicating, the transmitting solid angle can be very narrow, thereby reducing or prohibiting interception for anyone not accidently in the beam itself. The communication bandwidth may be independently chosen. Also, as previously stated, the operation of the system is simple and straightforward.

Although the figures and description above have shown and described particular implementations and details of dual-mode terahertz imaging systems and communication systems using terahertz imagers, this disclosure is not limited to the specific examples shown and described above. Any other suitable dual-mode infrared/visible and terahertz imaging system or communication system that operates in the same or similar manner as those described above fall within the scope of this disclosure. Moreover, all numerical values given above (such as dimensions, frequencies, efficiencies, time constants, and NEP and NEDT values) are approximate values only and are provided as examples only. Other dual-mode infrared/visible and terahertz imaging systems or communication systems could operate using different values or ranges of values. Similarly, all materials described above (such as vanadium oxide, amorphous silicon, crystalline quartz, gold, and nickel) are provided as examples only. Other dual-mode infrared/visible and terahertz imaging systems or communication systems could be fabricated using other or additional materials.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a link receiver comprising a detector array configured to receive radiation from a remote communication device, the detector array comprising multiple detectors, each detector comprising:
      a horn receiver configured to capture the radiation using an antenna positioned in or proximate to a throat of the horn receiver, the antenna coupled to an antenna load; and
      a bolometer electrically isolated from the antenna load and in thermal contact with the antenna load.

2. The apparatus of claim 1, wherein the link receiver comprises a terahertz camera.

3. The apparatus of claim 1, wherein the detector array is located at a focal plane of an optical system configured to receive the radiation through a specified far-field solid angle.

4. The apparatus of claim 1, wherein the link receiver is configured to:
   identify one or more of the detectors in the detector array that receive the radiation from the remote communication device; and
   determine an angular origin of the radiation relative to a central axis of the link receiver.

5. The apparatus of claim 1, further comprising:
   a link transmitter configured to generate and transmit second radiation to the remote communication device.

6. The apparatus of claim 1, further comprising:
   a communication transmitter/receiver configured to communicate with the remote communication device.

7. The apparatus of claim 6, wherein the communication transmitter/receiver is bore-sighted with the link receiver.

8. The apparatus of claim 1, further comprising:
   a metal plate comprising holes and forming a band pass filter, the band pass filter covering an aperture of the link receiver.

9. A system comprising:
   a first communication device comprising:
      a link receiver comprising a detector array configured to receive first radiation from a second communication device, the detector array comprising multiple detectors, each detector comprising:
         a horn receiver configured to capture the first radiation using an antenna positioned in or proximate to a throat of the horn receiver, the antenna coupled to an antenna load; and
         a bolometer electrically isolated from the antenna load and in thermal contact with the antenna load;
      a link transmitter configured to transmit second radiation to the second communication device; and
      a communication transmitter/receiver configured to communicate with the second communication device.

10. The system of claim 9, wherein:
    the link transmitter is bore-sighted with the link receiver; and
    the communication transmitter/receiver is bore-sighted with the link receiver.

11. The system of claim 9, wherein the link transmitter and the link receiver are integrated.

12. The system of claim 9, wherein the link transmitter and the link receiver are located next to the communication transmitter/receiver.

13. The system of claim 9, further comprising:
    the second communication device comprising:
       a second link receiver;
       a second link transmitter; and
       a second communication transmitter/receiver;
    wherein the communication devices are configured to use the link receivers and the link transmitters to identify angular coordinates of one another; and
    wherein the communication devices are configured to use the communication transmitters/receivers to exchange information.

14. The system of claim 13, wherein the communication devices are configured to use link pulses to search for one another at a carrier frequency above about 90 GHz.

15. The system of claim 9, wherein the first communication device is configured to maintain aim towards the second communication device using the link transmitter and the link receiver.

16. The system of claim 13, wherein the second communication device is configured to maintain aim towards the first communication device using the second link transmitter and the second link receiver.

17. The system of claim 13, wherein:
    the link receivers of the first and second communication devices comprise modified Cassegrain imaging systems; and
    the communication transmitters/receivers of the first and second communication devices comprise Cassegrain optical systems.

18. The system of claim 17, wherein:
    each modified Cassegrain imaging system comprises a first primary mirror and a first secondary mirror, the associated detector array located at a focal plane of the modified Cassegrain imaging system; and
    each Cassegrain optical system comprises a second primary mirror and a second secondary mirror, the associated communication transmitter/receiver located at a focal point of the Cassegrain optical system.

19. A method comprising:
    identifying, at a first communication device, angular coordinates to a second communication device using a link receiver at the first communication device; and
    communicating with the second communication device using a communication transmitter/receiver of the first communication device;
    wherein the link receiver comprises a detector array configured to receive radiation from the second communication device, the detector array comprising multiple detectors, each detector comprising:
       a horn receiver configured to capture the radiation using an antenna positioned in or proximate to a throat of the horn receiver, the antenna coupled to an antenna load; and
       a bolometer electrically isolated from the antenna load and in thermal contact with the antenna load.

20. The method of claim 19, further comprising:
    identifying, at the second communication device, angular coordinates to the first communication device using a second link receiver at the second communication device; and communicating with the first communication device using a second communication transmitter/receiver of the second communication device;
wherein the second link receiver comprises a second detector array configured to receive second radiation from the first communication device, the second detector array comprising multiple second detectors, each second detector comprising:
- a second horn receiver configured to capture the second radiation using a second antenna positioned in or proximate to a second throat of the second horn receiver, the second antenna coupled to a second antenna load; and
- a second bolometer electrically isolated from the second antenna load and in thermal contact with the second antenna load.

21. The method of claim 20, wherein:
the link receivers of the first and second communication devices comprise modified Cassegrain imaging systems;
the communication transmitters/receivers of the first and second communication devices comprise Cassegrain optical systems; and
the method comprises:
- engaging in mutual wide band communication between the first and second communication devices using the Cassegrain optical systems; and
- engaging in mutual communication between the first and second communication devices over a very narrow beam using the modified Cassegrain imaging systems to maintain pointing accuracy.

22. The method of claim 19, further comprising:
transmitting second radiation to the second communication device using a link transmitter of the first communication device.

23. The method of claim 19, further comprising:
filtering the radiation from the second communication device using a plate comprising holes and forming a band pass filter.

24. The apparatus of claim 1, wherein each detector further comprises:
- antenna posts having first ends connected to the antenna and extending through irises in a conducting ground plane; and
- conductive traces connected to second ends of the antenna posts and electrically coupled to the antenna load;
wherein the antenna and the conductive traces are located on opposing sides of the conducting ground plane.

25. The apparatus of claim 1, wherein the detector array is configured to receive the radiation at a frequency of about 90 GHz to about 300 GHz.

* * * * *